(12) United States Patent
Abu-Ageel

(10) Patent No.: US 8,096,668 B2
(45) Date of Patent: Jan. 17, 2012

(54) ILLUMINATION SYSTEMS UTILIZING WAVELENGTH CONVERSION MATERIALS

(76) Inventor: Nayef M. Abu-Ageel, Haverhill, MA (US)

(*) Notice: Subject to any disclaimer, the term of this patent is extended or adjusted under 35 U.S.C. 154(b) by 227 days.

(21) Appl. No.: 12/355,605

(22) Filed: Jan. 16, 2009

(65) Prior Publication Data
US 2010/0046234 A1    Feb. 25, 2010

Related U.S. Application Data

(60) Provisional application No. 61/021,566, filed on Jan. 16, 2008.

(51) Int. Cl.
*F21V 9/16* (2006.01)
*G02B 6/00* (2006.01)

(52) U.S. Cl. .......... 362/84; 362/551; 362/296.01

(58) Field of Classification Search .......... 362/84, 362/551, 296.01, 308, 307, 341, 293, 259, 362/34; 385/146, 123, 133, 901
See application file for complete search history.

(56) References Cited

U.S. PATENT DOCUMENTS

| | | | |
|---|---|---|---|
| 6,234,648 B1 * | 5/2001 | Borner et al. | 362/235 |
| 6,784,462 B2 | 8/2004 | Schubert | |
| 7,040,774 B2 * | 5/2006 | Beeson et al. | 362/84 |
| 7,070,300 B2 | 7/2006 | Harbers et al. | |
| 7,234,820 B2 | 6/2007 | Harbers et al. | |
| 7,270,428 B2 | 9/2007 | Alasaarela et al. | |
| 7,306,344 B2 | 12/2007 | Abu-Ageel | |
| 7,318,644 B2 | 1/2008 | Abu-Ageel | |
| 7,379,651 B2 | 5/2008 | Abu-Ageel | |
| 7,400,805 B2 | 7/2008 | Abu-Ageel | |
| 7,607,814 B2 * | 10/2009 | Destain | 362/609 |
| 2007/0029561 A1 | 2/2007 | Cho et al. | |
| 2007/0189352 A1 | 8/2007 | Nagahama et al. | |
| 2007/0274095 A1 * | 11/2007 | Destain | 362/609 |

OTHER PUBLICATIONS

J.-Q. Xi et al., "Internal high-reflectivity omni-directional reflectors", Applied Physics Letters 87, 2005, pp. 031111-031114.

* cited by examiner

*Primary Examiner* — Bao Q Truong
(74) *Attorney, Agent, or Firm* — Gavrilovich, Dodd & Lindsey, LLP

(57) ABSTRACT

A wavelength conversion material with an omni-directional reflector is utilized to enhance the optical efficiency of an illumination system. Light guides with restricted output apertures, micro-element plates and optical elements are utilized to enhance the brightness of delivered light through light recycling. In addition, micro-element plates may be used to provide control over the spatial distribution of light in terms of intensity and angle. Efficient and compact illumination systems are also disclosed.

20 Claims, 25 Drawing Sheets

ILLUMINATION SYSTEMS UTILIZING WAVELENGTH CONVERSION MATERIALS

This application claims the benefit of U.S. Provisional Application No. 61/021,566 filed on Jan. 16, 2008, which is hereby incorporated by reference.

TECHNICAL FIELD

The disclosure relates generally to illumination systems. More particularly, it relates to illumination systems utilizing wavelength conversion materials such as phosphor to produce light with different colors.

BACKGROUND

Illumination systems that utilize a wavelength conversion material such as phosphor to produce light of specific range of wavelengths (e.g. red, green and blue wavelengths) have advantages over illumination systems that produce these specific wavelengths directly and without using a wavelength conversion material. These advantages include better color stability, color uniformity and repeatability. In case of lasers, wavelength conversion can provide a low-cost way for producing visible light (e.g. green) when compared to frequency doubling methods. However, light coupling efficiency suffers significantly in this case due to brightness loss (i.e. etendue of converted light is much higher than that of the light source)

The prior art describes various wavelength conversion based illumination systems. For example, in U.S. patent application Ser. No. 11/702,598 (Pub. No.: US20070189352), Nagahama et al. describes a light emitting device 100 utilizing a wavelength conversion layer 30, as illustrated in FIG. 1A. The light emitting device 100 consists of a light source 10, a light guide 20, a light guide end member 47, an optional reflective film 80, a wavelength conversion member 30, a reflection member 60, and a shielding member 70. The light guide 20 transfers the light emitted from the light source 10, and guides the light to the wavelength conversion element 30. Some of this light is absorbed by element 30 and emitted at a converted wavelength. Reflective film 80 enhances the efficiency by reflecting excitation (source) light that was not absorbed back toward wavelength conversion element 30 and by also reflecting converted light toward the emission side of light emitting device 100. Reflection member 60 reflects at least part of the excitation light back toward the wavelength conversion member 30 in order to increase the light emitting efficiency. The shielding member 70 blocks the excitation light and transmits a light of a specific wavelength. In light emitting device 100, portions of source and converted light beams exit light emitting device 100 through the edges of wavelength conversion member 30, reflection member 60, shielding member 70 and reflective film 80, thus, resulting in light losses and lower optical efficiency. In addition, the reflectivity of reflective film 80 can be enhanced further, thus, reducing optical losses. Therefore, there is a need for systems that can reduce or eliminate light losses and enhance overall efficiency.

In U.S. Pat. No. 7,040,774, Beeson et al. proposes illumination system 200. As shown in FIG. 1B, illumination system 200 is comprised of a light emitting diode (LED) 116, a wavelength conversion layer 124 (e.g. phosphor), a light-recycling envelope 112 made from a reflective material (or having a reflective coating applied to its internal surfaces), an optional light guide 126, an optional optical element 125 (e.g. reflective polarizer or dichroic mirror) and a light output aperture 114. The LED 116 has a light emitting layer 118 and a reflective layer 120. The light guide 126 transfers the light emitted from the light emitting layer 118 to the light-recycling envelope 112 through an opening 127 in the envelope 112. Part of the source light gets absorbed by wavelength conversion layer 124 and emitted at a second wavelength band. Recycling of the source light within the envelope 112 helps convert more of it into the second wavelength band. Some of the source light and converted light leave the envelope 112 through the opening 127 and get guided by the light guide 126 back toward the LED 116. The reflective layer 120 of LED 116 reflects part of the source light and converted light toward the envelope 112. Some of the light exiting through the output aperture 114 gets transmitted and the remainder gets reflected back toward the envelope 112 by optical element 125. This process continues until all the light within the envelope 112 is either transmitted through optical element 125, absorbed or lost. Illumination system 200 delivers light with enhanced brightness when compared to the brightness of the source and converted light beams. However, illumination system 200 is not efficient in light recycling due to the limited reflectivity of the reflective layer applied to the interior surface of light-recycling envelope 112. Therefore, systems with enhanced recycling efficiency are required in order to reduce light losses and improve the overall efficiency.

In U.S. Pat. No. 7,070,300, Harbers et al. proposes illumination system 300 having a wavelength conversion element 212 that is physically separated from the light source 202 as shown in FIG. 1C. Illumination system 300 consists of a wavelength conversion element 212 (e.g. phosphor), a light source 202 (e.g. LED) mounted over an optional submount 204, which is in turn mounted on a heatsink 206, a first light collimator 208 to collimate light emitted from the light source, a color separation element 210, a second light collimator 214 to collimate light emitted from the wavelength conversion element 212, a first radiance enhancement structure 222 (e.g. a dichroic mirror or a diffractive optical element) mounted over the wavelength conversion element 212, a highly reflective substrate 215 mounted over a heatsink 216, a second radiance enhancement structure 218 (e.g. diffractive optical element, micro-refractive element, or brightness enhancement film) and a polarization recovery component 220. Light emitted from light source 202 is collimated by first light collimator 208 and directed toward the second light collimator 214 by color separation element 210. Second light collimator 214 concentrates a certain amount of this light on the wavelength conversion element 212, which in turn converts part of the source light into a light having a second wavelength band (i.e. converted light). This converted light gets collimated by the second light collimator 214 and transmitted by the color separation element 210 toward the second radiance enhancement structure 218, which in turn passes part of this light toward the polarization recovery component 220 and reflects the remainder toward the wavelength conversion element 212. The polarization recovery component 220 passes light with one polarization state and reflects the other state toward wavelength conversion element 212.

In U.S. Pat. No. 7,234,820, Harbers et al. proposes illumination system 400 having light collimators 375 and 381 having reflective apertures 390 and 391 for the purpose of enhancing the brightness of delivered light. As shown in FIG. 1D, illumination system 400 is comprised of a wavelength conversion element 374 (e.g. phosphor) mounted on a heatsink 376, a first fan 377, a light source 376 (e.g. LED) mounted on a heatsink 386, a second fan 387, a first light collimator 375 to collimate converted light emitted from the wavelength conversion element 374, a first reflective aperture 390 at the exit face of the first light collimator 375, a dichroic mirror 382, a second light collimator 381 to collimate light emitted from the light source 376, a second reflective aperture 391 at the exit face of second light collimator 381, and light tunnel 384. Light emitted from light source 376 is collimated by first light collimator 381 and directed toward the second light collimator 375. Some of this light exits the second reflective aperture 391 and the remainder gets reflected back toward the light source 376. The second light collimator 375 concentrates the light received through its reflective aperture 390 on the wavelength conversion element 374, which in turn converts part of the source light into a light having a second wavelength band (i.e. converted light). This converted light gets collimated by the first light collimator 375 and part of it passes through the first reflective aperture 390 toward the dichroic mirror 382, which in turn reflects the converted light toward light tunnel 384.

Illumination systems 300 and 400 are not compact. In addition, these systems 300 and 400 are not efficient in light recycling due to the limited reflectivity of the reflective layers utilized in these systems 300 and 400, especially, the reflective coatings that are located directly below the wavelength conversion element 212 and 374. Therefore, systems with more compactness and enhanced recycling efficiency are needed in order to reduce light losses and improve the overall optical and electrical efficiencies.

Known wavelength conversion based illumination systems suffer from limited efficiency, limited compactness and lack of control over spatial distribution of light delivered in terms of intensity and angle. Therefore, there is a need for compact, light weight, efficient and cost-effective illumination systems that provide control over spatial distribution of light in terms of intensity and angle over a certain area such as the active area of a display panel. Such illumination systems enable miniature projection systems with smaller light valves (~0.2") leading to more compactness and less expensive projection systems.

SUMMARY

An aspect of the present disclosure describes simple, low cost and efficient illumination systems, each capable of producing a light beam of selected cross-section and selected spatial distribution of light, in terms of intensity and angle.

The disclosed illumination systems utilize wavelength conversion materials with an omni-directional reflector to enhance the optical efficiency. In addition, they utilize light recycling, micro-guide plates and optical elements to enhance the brightness of delivered light.

Other aspects, features, advantages of the systems will be or will become apparent to one with skill in the art upon examination of the following figures and detailed description. It is intended that all such additional aspects, features, and advantages be included within this description and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Illumination assemblies and systems that utilize wavelength conversion materials such as phosphors and light sources such as lasers and light emitting diodes (LEDs) are shown in FIGS. 2-6. Examples of lasers that can be used in this disclosure include edge-emitting diode lasers and vertical cavity surface-emitting lasers (VCSELs). Examples of LEDs include inorganic LEDs and organic LEDs. The wavelength of light sources used in this disclosure ranges from 100 nm to 3000 nm. More preferably their wavelength ranges between 200 nm and 450 nm.

The wavelength conversion material of this disclosure absorbs light of a first wavelength range and emits light of a second wavelength range (i.e. converted light). The wavelength range of a converted light is usually higher than that of the absorbed light, which is typically referred to as source, excitation, or pump light.

Figure 2A:
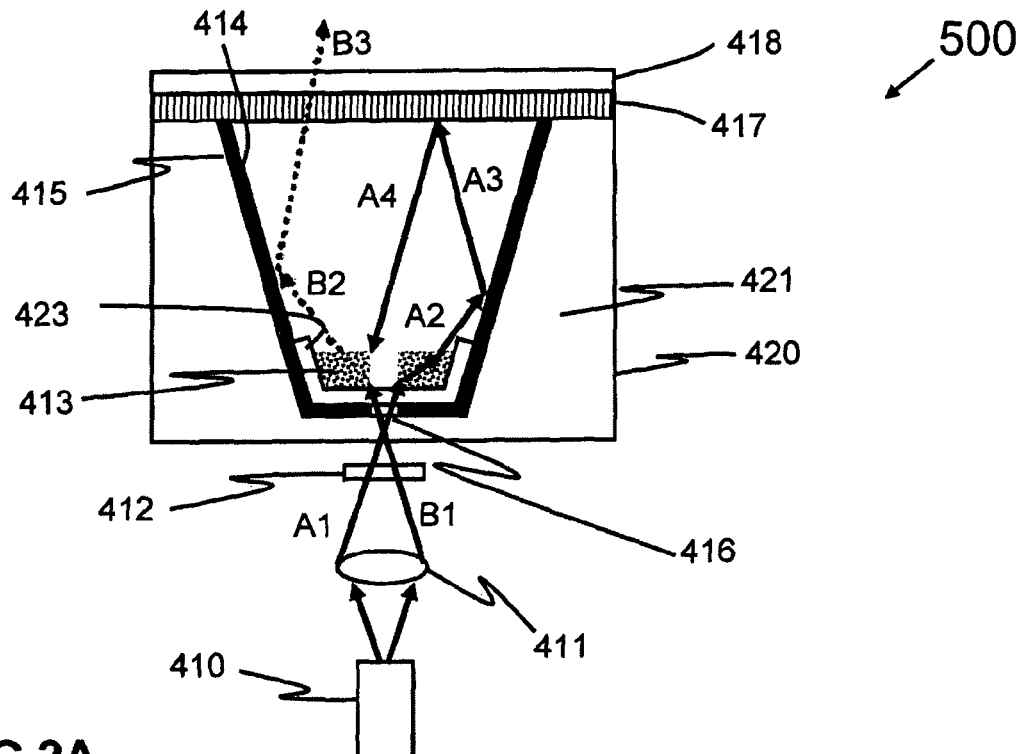
FIG. 2A is a cross-sectional view of an illumination system with a reflective coating applied to the interior surface of the light guide.

FIG. 2A shows a cross-sectional view of an illumination assembly 500. Illumination assembly 500 consists of a light source 410, hollow light guide 420 having an interior cavity, a wavelength conversion layer 413 located in the interior cavity, an optional low-refractive index layer 423 located between the wavelength conversion layer 413 and the reflective coating 414, an optional lens 411, an optional optical element 412 located between the clear opening 416 and the light source 410, an optional optical element 417 located at or beyond the exit aperture of the light guide 420, and an optional collimating plate 418 located at the exit aperture of optical element 417. Alternatively, the collimating plate 418 can be located between the exit aperture of the light guide 420 and the input aperture of optical element 417. The hollow light guide 420 can be made of an optically transmissive or opaque material 421 with a reflective coating 414 applied to its internal surfaces 415 except for a clear opening 416 that receives input light from the light source 410. The clear opening 416 can be located anywhere within the entrance face of light guide 420 and does not have to be at the center of entrance face. If light guide 420 is made of an optically non-transmissive (i.e. opaque) material, the clear opening 416 will have to be free of any opaque material in order to allow light from source 410 to pass into the light guide 420 without substantial losses. Lens 411 can be removed and source 410 can be connected directly (or brought in close proximity) to the clear opening 416. It is also possible to use a solid or hollow light guide or an optical fiber to couple light from the source 410 to the clear opening 416. The low-refractive index layer 423 can extend beyond the wavelength conversion layer 413 to cover the interior surface of the reflective coating 414 partly or completely. The refractive index n of layer 423 should be lower than that of the wavelength conversion layer 413 and preferably below 1.2. Examples of such layer 423 include air (n=1) and nano-porous $SiO_2$ (n=1.1). Nano-porous $SiO_2$ is preferable since it conducts heat more efficiently than an airgap. The clear opening 416 can be made of optically transmissive materials such as glass and air. Light guide can have straight sidewalls, tapered sidewalls, or a combination of both. The light guide can have any shape and can be made of metal, glass, organic material, inorganic material, translucent material, molded plastic or molded metal (e.g. aluminum and metal alloys). Optical element 417 can be a reflective polarizer, dichroic mirror, a dichroic cube, diffractive optical element, micro-refractive element, brightness enhancement film, hologram, a filter that blocks (absorbs and/or reflects) UV or near UV light, a photonic crystal or a combination of two or more of these elements. A photonic crystal is a one-, two-or three-dimensional lattice of holes formed in a substrate, film, coating or semiconductor layer. The reflective coating is preferably specular but can be diffusive. For example, a diffractive optical element that passes a light with limited cone angle and reflects high-angled light can be used to enhance the brightness of delivered light. Optical element 417 can be purchased from Oerlikon Optics USA Inc. located in Golden, Colo., Optical Coating Laboratory, Inc. located in Santa Rosa, Calif., and 3M located in St. Paul, Minn.

The size and shape of the clear opening 416 can be circular, square, rectangular, oval, one or two dimensional array of openings, or any other shape. For example, a rectangular opening can receive a line of light from a laser source, laser array, or micro-laser array. It is also possible to have an array of clear openings associated with an array of optional lenses and corresponding to an array of light sources (e.g. lasers). The size of the clear opening 416 (and clear openings of illumination assemblies and systems of this disclosure) can range from 5 microns to several millimeters depending on the type of light source, source wavelength, the size of the light beam as well as shape and size of the light guide 420. For example, some laser beams can be focused into a clear opening 416 with a diameter of 5-50 microns.

The length of light guide 420 and light guides of illumination assemblies and systems of this disclosure range from a sub-millimeter to tens of millimeters depending on the size of its entrance and exit apertures, cone angle of light propagating within the light guide 420 and degree of desired light uniformity. Examples of some suitable light guides are described in related U.S. Pat. Nos. 7,306,344, and 7,318,644, which are incorporated herein by reference.

The operation of illumination assembly 500 is described as follows. Light emitted from source 410 (e.g. laser) is focused by lens 411 into a spot within the clear opening 416. The received light enters the interior cavity of the light guide 420 where part of it strikes the wavelength conversion layer 413. Part of the light impinging on the wavelength conversion layer 413 gets absorbed and converted into light with a new wavelength band (i.e. converted light) and the remainder gets diffused by the wavelength conversion layer 413 but does not get converted. Both the source light and converted light get collimated by the light guide 420 and impinge on the entrance aperture of optical element 417 and collimating plate 418 at a reduced cone angle when compared to that of the diffused source light and converted light at the wavelength conversion layer 413. Optical element 417 reflects a substantial amount of the source light that impinges on it toward the wavelength conversion layer 413, thus, providing another chance for source light to be converted by the wavelength conversion layer 413. The low-refractive index layer 423 enhances the reflectivity of the reflective coating (or mirror) 414, which is located below the wavelength conversion layer 413, and establishes with the reflective coating 414 an omni-directional reflector with very low optical losses. The thickness of the low-refractive index layer 423 is approximately equal to $\lambda/4n$, where $\lambda$ is the wavelength of light propagating in the low-refractive index layer 423 and n is the refractive index of the low-refractive index layer 423. In order to prevent the evanescent wave field from reaching the mirror below the low-refractive index layer 423, the thickness of low-refractive index layer 423 is preferably made larger than the $\lambda/4n$ value. For example, this thickness is preferably made 1 µm or larger for visible light cases. The low-refractive index layer 423 can be electrically insulating or conducting and can be, for example, made of air or nano-porous $SiO_2$, which has a low refractive index n of 1.10. The mirror 414 located below the low-refractive index layer 423 can be made of a metal reflector (e.g. silver or Al), a multilayer stack of high-index low-index dielectric materials (e.g. $TiO_2/SiO_2$), or a multilayer stack of high-index low-index dielectric materials followed by a metal reflector. Discussions of omni-directional reflectors are presented by J.-Q. Xi et al. in the "Internal high-reflectivity omni-directional reflectors", Applied Physics Letters 87, 2005, pp. 031111-031114, Fred E. Schubert in U.S. Pat. No. 6,784,462, and Jae-hee Cho in U.S. patent application Ser. No. 11/271,970. Each of these three documents is incorporated herein by reference.

Since efficiency of optical element 417 (e.g. a dichroic mirror) in reflecting light impinging on it is higher for light with a limited cone angle, utilizing a tapered light guide 420 leads to the collimation of the source light, which gets diffused by the wavelength conversion layer 413, and allows better conversion efficiency. For example, ray A1 gets diffused (not converted) by wavelength conversion layer 413 and exits this layer 413 as ray A2, which in turn gets collimated by light guide 420 as ray A3 and then reflected back toward the wavelength conversion layer 413 by optical element 417 as ray A4. On the other hand, ray B1 gets converted by wavelength conversion layer 413 into ray B2 (in a second wavelength band) and exits illumination system 500 as ray B3. The impact of optical element 417 and/or collimating plate 418 on ray B2 depends on their designs and FIG. 2A shows a simplified case that does not illustrate all reflections and/or refractions.

If the light source 410 is a laser, all or a substantial amount of emitted light will be transmitted into the light guide 420 through a very small clear opening 416. Part of the light reflected back by the optical element 417 and/or collimating plate 418 toward the wavelength conversion layer 413 exits through the clear opening 416. Also, part of light scattered by the wavelength conversion layer 413 may exit through the clear opening 416. As the size of the clear opening 416 is reduced, less light exits the light guide 420, thus, leading to better optical efficiency.

Optical element 412 can be a coating applied directly to the internal or external surface of the clear opening 416 as long as opening 416 is not a hollow opening (e.g. opening filled with a gas such as air). Alternatively, optical element 412 can be a coating on an optically transmissive substrate that is directly attached to the internal or external surface of the clear opening 416. In general, optical element 412 allows light from source 410 to pass through it into the light guide 420 and reflects part or most of light with other wavelengths (e.g. the converted light) traveling in the opposite direction back toward light guide 420, thus, enhancing the optical efficiency of the illumination system 500.

The different structures and operation of collimating plate 418 are discussed below in connection with FIG. 7-10.

Figure 2B:
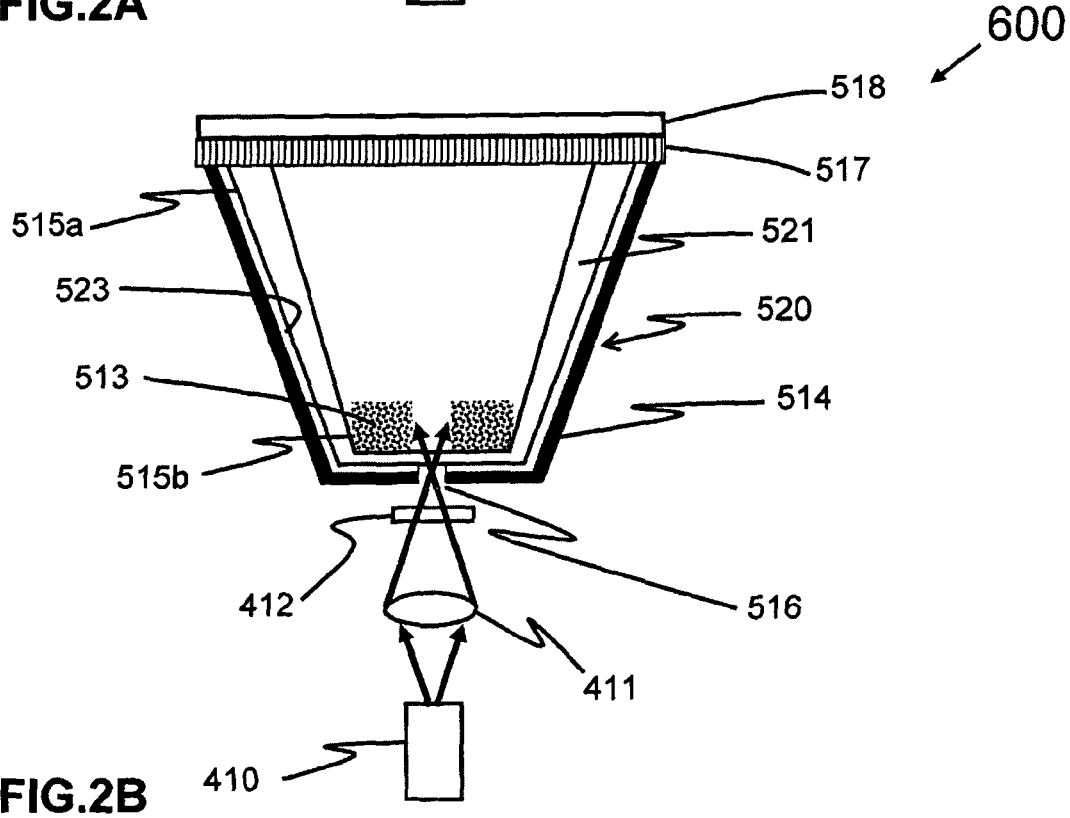
FIG. 2B is a cross-sectional view of an illumination system with a reflective coating applied to the exterior surface of the light guide.

FIG. 2B shows cross-sectional view of an illumination assembly 600. Illumination assembly 600 utilizes a hollow light guide 520 made from an optically transmissive material 521 and an external reflective coating 514. The term optically transmissive means that light (in the relevant wavelength range) passes through the material, composition or structure with little or no absorption. Illumination assembly 600 consists of a light source 410, hollow light guide 520, a wavelength conversion layer 513, an optional low-refractive index layer 523 located between the external surface 515a of the hollow light guide 520 and the reflective coating 514, optional lens 411, an optional optical element 412 located between the clear opening 516 and the laser light source 410, an optional optical element 517 located at or beyond the exit aperture of the light guide 520, and an optional collimating plate 518 located at the exit aperture of optical element 517. Alternatively, the collimating plate 518 can be located between the exit aperture of the light guide 520 and the input aperture of optical element 517. Light enters the hollow light guide 520 through a clear opening 516 made in the reflective coating 514. It is also possible to have a hollow opening made in the body of the light guide 520. Such a hollow opening eliminates Fresnel reflections as light enters the light guide 520 from the light source 410 and eliminates the need for antireflective coatings that are usually used to minimize Fresnel reflections. In addition, a hollow opening eliminates problems associated with material damage as high intensity light enters the transmissive material of the clear opening 516. The clear opening 516 can be free of the low-refractive index layer 523 as shown in FIG. 2B. The functions of reflective coating 514, wavelength conversion layer 513, low-refractive index layer 523, light source 410, lens 411, optical element 412, optical element 517 and collimating plate 518 are similar to these described in connection with FIG. 2A. The operation of illumination assembly 600 is similar to that of illumination assembly 500.

Illumination assembly 600 has the advantage of allowing the application of the reflective optical coating 514 and low-refractive index layer 523 after performing the curing and/or annealing step of the wavelength conversion layer 513. Since exposing the reflective optical coating 514 and low-refractive index layer 523 to high temperatures may degrade their quality, a design that allows the application of such coatings 514 and 523 to the light guide 520 after completing the high-temperature curing/annealing step is highly desirable. In some cases where high temperature treatment does not degrade the low-refractive index layer 523, this layer 523 can be sandwiched between the internal surface 515b of the light guide 520 and the wavelength conversion layer 513.

Figure 2C:
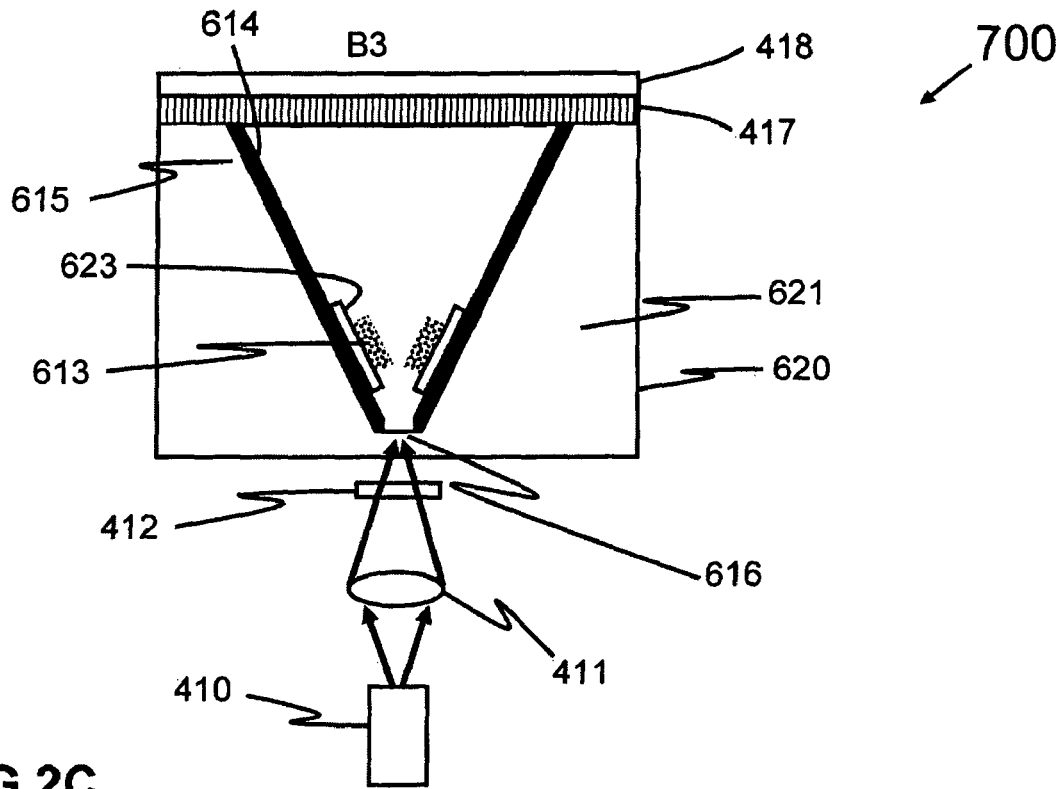
FIG. 2C is a cross-sectional view of an illumination system with a reflective coating applied to the interior surface of the light guide, which has a clear opening equal to its entrance face.
Figure 2D:
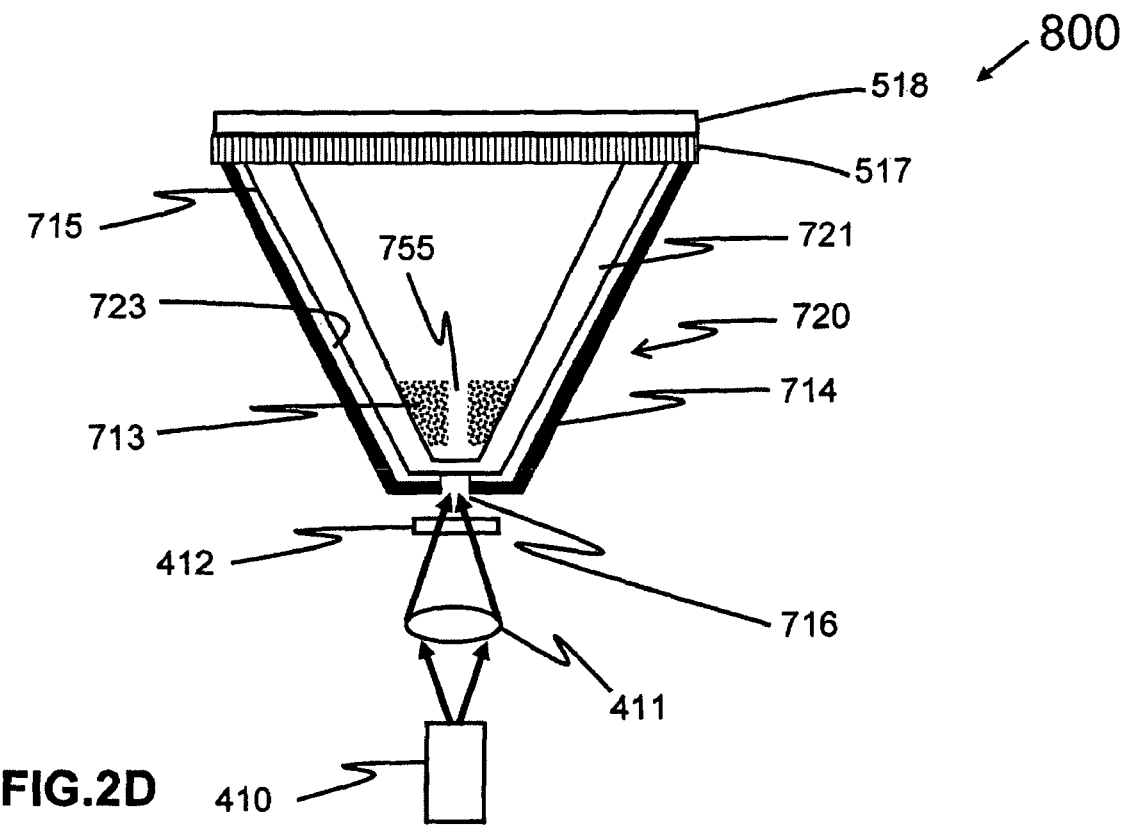
FIG. 2D is a cross-sectional view of an illumination system with a reflective coating applied to the exterior surface of the light guide, which has a clear opening equal to its entrance face.

FIGS. 2C and 2D show cross-sectional views of illumination assemblies 700 and 800. Illumination assemblies 700 and 800 utilize hollow light guides 620 and 720 with entrance faces that are equal in size to the clear openings 616 and 716. In case of illumination assembly 700, the reflective coating 614 is applied to the internal surface 615 of light guide 620. An optional low-refractive index layer 623 may exist between the reflective coating 614 and the wavelength conversion layer 613 that can have any shape, size or pattern. The hollow light guide 620 can be made of an optically transmissive or opaque material 621. The clear openings 616 can be made of an optically transmissive material at the source wavelength band or of an opening filled with air or another gas. Other parts 410, 411, 412, 417, 418 of illumination assembly 700 have the same functions as the parts 410, 411, 412, 417, 418 of illumination assembly 500 shown in FIG. 2A. For illumination assembly 800, an optional low-refractive index layer 723 may exist between the reflective coating 714 and the external surface 715 of light guide 720, which is made of an optically transmissive material 721. The wavelength conversion layer 713 fills part of the hollow light guide 720. The surface of layer 713 can be patterned. Alternatively, the whole layer 713 can be patterned or can have a cavity or hole 755 aligned with the clear opening 716 as shown in FIG. 2D. Other parts 410, 411, 412, 517, 518 of illumination assembly 800 have the same functions as the parts 410, 411, 412, 517, 518 of illumination assembly 600 shown in FIG. 2B.

Figure 3A:
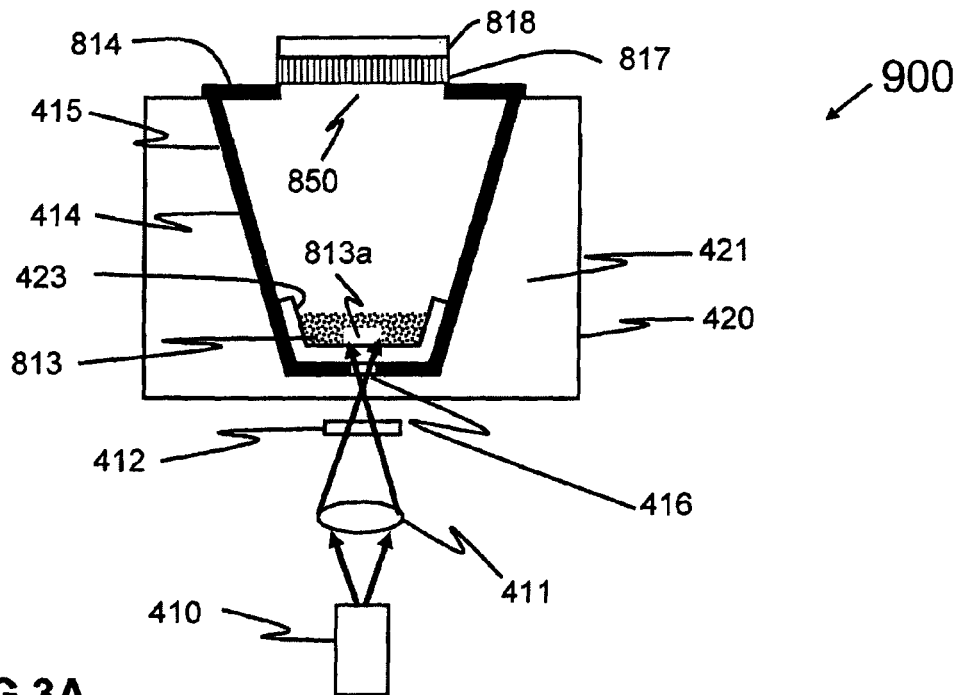
FIG. 3A is a cross-sectional view of an illumination system with a reflective coating applied to the interior surface of the light guide. This illumination system provides light with enhanced brightness through a limited output aperture.
Figure 3B:
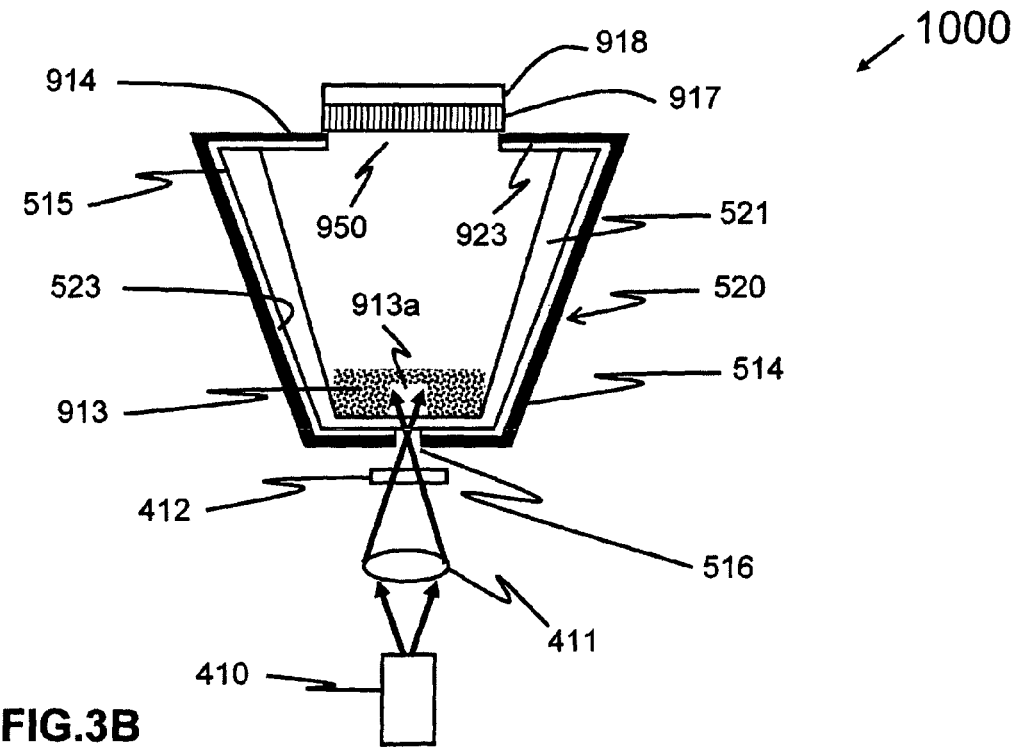
FIG. 3B is a cross-sectional view of an illumination system with a reflective coating applied to the exterior surface of the light guide. This illumination system provides light with enhanced brightness through a limited output aperture.

FIGS. 3A and 3B show cross-sectional views of illumination assemblies 900 and 1000. Illumination assemblies 900 and 1000 utilize hollow light guides 420 and 520 with a reflective coating 814 and 914 applied to their exit apertures except for output apertures 850 and 950. The reflective coatings 814 and 914 may reflect part or all of the wavelength bands available within the light guides 420 and 520. A low-refractive index layer 923 can be placed at the bottom side of the reflective coating 914 as shown in FIG. 3B and can be placed within the area of output aperture 950. The wavelength conversion layers 813 and 913 have cavities 813a and 913a aligned with the clear openings 416 and 516. These cavities 813a and 913a move the initial interaction of the source light 410 with the wavelength conversion layers 813 and 913 away from the clear openings 416 and 516, thus, reducing the amount of light (source and converted) that may be lost through the clear openings 416 and 516. The wavelength conversion layers 813 and 913 can fill the whole interior volume of hollow light guides 420 and 520. Illumination assemblies 900 and 1000 also include optional optical element 817 and 917 located at or beyond the output apertures 850 and 950 of the light guides 420 and 520, as well as optional collimating plates 818 and 918 located at the exit apertures of optical elements 817 and 917. Other parts 410, 411, 412, 416, 516, 420, 421, 423, 414, 415, 520, 521, 523, 514, 515 of illumination assemblies 900 and 1000 have the same function as these of illumination assemblies 500 and 600 shown in FIGS. 2A and 2B.

Illumination assemblies 900 and 1000 have the advantage of providing light with higher brightness through smaller output apertures 850 and 950 and operate in similar ways as described in illumination assemblies 500 and 600 except for the extra light recycling done by the reflective coatings 814 and 914. Since wavelength conversion materials (e.g. phosphors) have very low absorption of the converted or generated light, the recycling efficiency can be very high as long as other losses in the illumination assembly are minimized. Illumination assemblies that can deliver light with enhanced brightness are discussed in U.S. Pat. Nos. 7,070,300 and 7,234,820 to Harbers et al., U.S. Pat. No. 7,040,774 to Beeson et al. and U.S. patent application Ser. No. 11/702,598 (Pub. No.: US20070189352) to Nagahama et al., which are all incorporated herein by reference.

Each of illumination assemblies 900 and 1000 may have two or more output apertures 850 and 950.

Figure 4A:
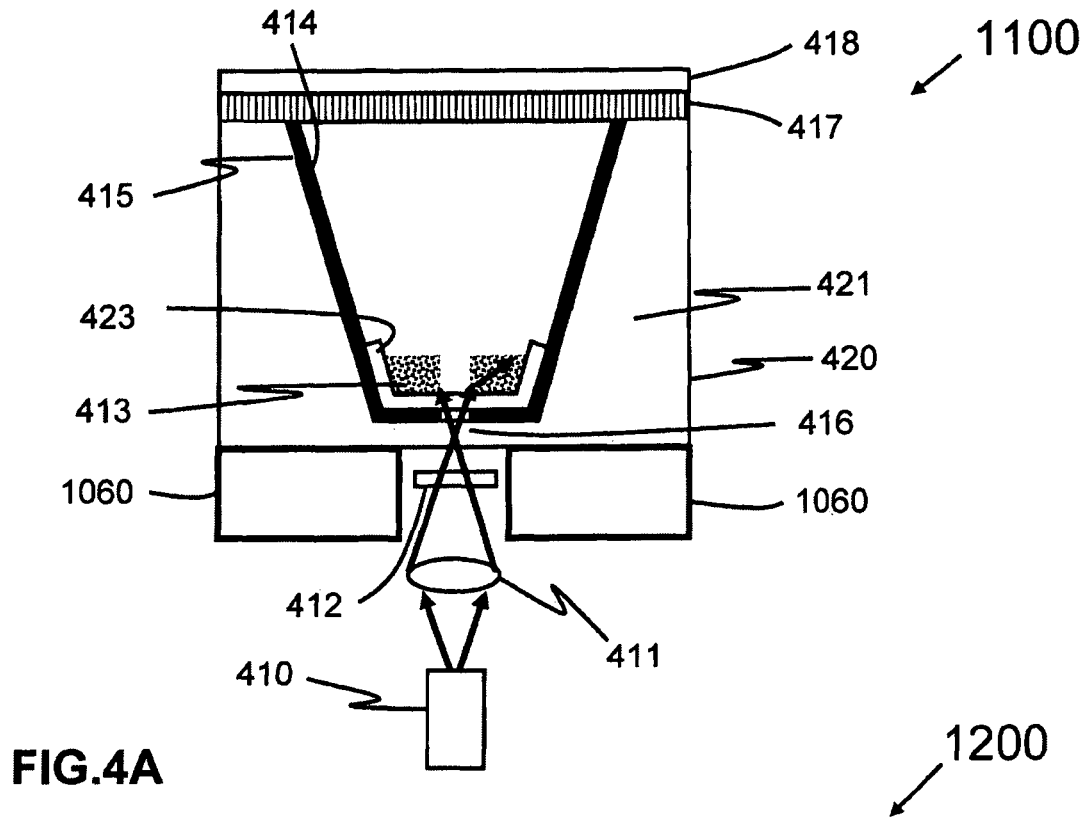
FIG. 4A is a cross-sectional view of an illumination system utilizing a heatsink and a reflective coating applied to the interior surface of the light guide.
Figure 4B:
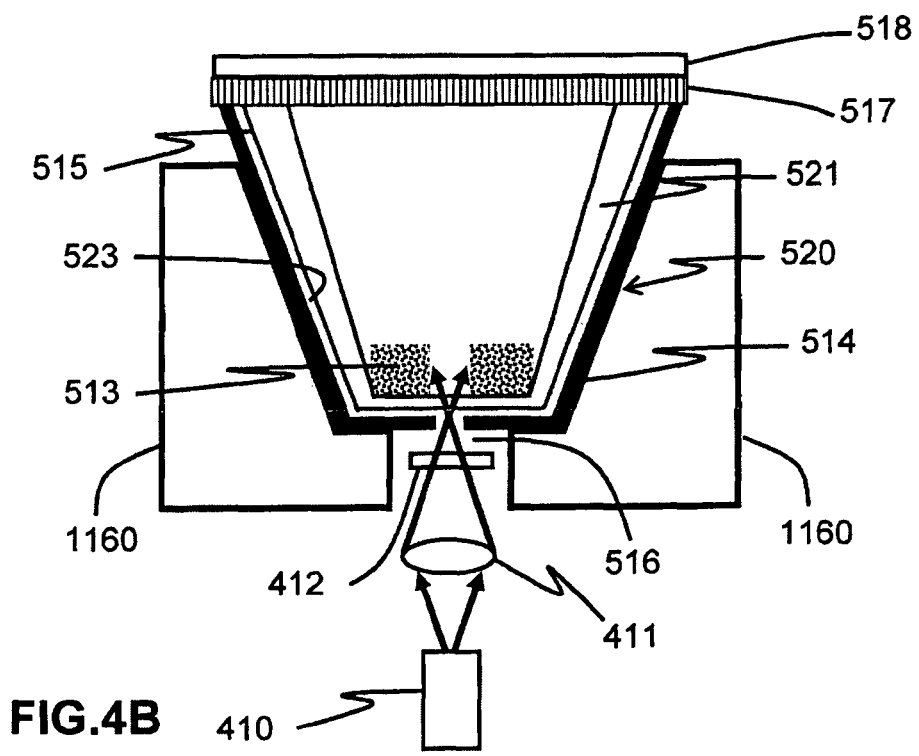
FIG. 4B is a cross-sectional view of an illumination system utilizing a heatsink and a reflective coating applied to the exterior surface of the light guide.

FIGS. 4A and 4B show cross-sectional views of illumination assemblies 1100 and 1200. Illumination assemblies 1100 and 1200 utilize heat sinks 1060 and 1160 for dissipation of heat generated in the wavelength conversion layers 413 and 513. Except for the heat sinks 1060 and 1160, illumination assemblies 1100 and 1200 have the same structure and operation as these of illumination assemblies 500 and 600 of FIGS. 2A and 2B.

The illumination assemblies 700, 800, 900 and 1000 include heat sinks similar to these of FIGS. 4A and 4B.

The portion of the interior volume of the hollow light guide 420, 520, 620 and 720 that has no wavelength conversion layer can be filled (partly or completely) with a transparent material such as gas, glass, and plastic.

The wavelength conversion layer 413, 513, 613, 713, 813 and 913 can be made by mixing a phosphor powder and a glass powder and molding the obtained mixed powder utilizing, for example, a hot press molding. Alternatively, a binding medium (e.g. epoxy or silicone) containing phosphor particles is molded to have a desired shape (e.g. a sheet that can divided into smaller sizes).

The Wavelength conversion layer 413, 513, 613, 713, 813 and 913 can be a quantum dot material, a luminescent dopant material or a binding medium containing a quantum dot material and/or a luminescent dopant material. The wavelength conversion material 413, 513, 613, 713, 813 and 913 can be attached to the light guide 420, 520, 620 and 720 using low melting glass, a resin, fusion or high temperature fusion. It is also possible to apply the phosphor powder of each color by screen printing, injection printing, or dispenser printing using paste which is mixed in preparation with a binder solution containing, for example, terpineol, n-butyl-alcohol, ethylene-glycol, and water. Examples of phosphor materials that generate green light include thiogallate (TG), SrSiON:Eu, and SrBaSiO:Eu. Phosphor materials that generate amber light include BaSrSiN:Eu. Phosphor materials that generate red light include CaS:Eu, $(Sr_{0.5},Ca_{0.5})$S:Eu, SrS:Eu, and SrSiN:Eu and YAG is a phosphor material that generates white light. In addition, other wavelength conversion materials such as dyes can be used. The wavelength conversion layer 413, 513, 613, 713, 813 and 913 may fully fill or partly fill the interior volume of the hollow light guide 420, 520, 620 and 720. Depending on the application, the thickness, length and width of the wavelength conversion layer 413, 513, 613, 713, 813 and 913 range from sub-millimeters to tens of millimeters. However, it is preferable to have a wavelength conversion layer with a diameter of 0.5-5 mm and a thickness of 0.1-1.0 mm.

In another configuration, the wavelength conversion layer 413, 513, 613, 713, 813 and 913 consists of mixtures and/or patterns of different types or amounts of phosphor. For example, the wavelength conversion layer 413, 513, 613, 713, 813 and 913 may include a blend of red, green, and blue phosphors that are excited by the light source 410 (e.g. a laser source) that emits a lower wavelength range, e.g., near UV or UV light. The combined red, green and blue light emitted from the phosphor blend forms a white light. Alternatively, the wavelength conversion layer 413, 513, 613, 713, 813 and 913 may include a blend of red and green phosphors that are excited by a blue laser source 410. In this case, the optical element 417, 517, 817, 917, 1414 and 1714 is partially transparent to blue light, thus, leading to the delivery of a white light (i.e. a combination of red, green and blue colors). In a second example, a blend of yellow and blue phosphors that are excited by a near UV or UV laser can be used to deliver white light for a certain application (e.g. automobile headlight). In another example, a yellow phosphor that is excited by a blue light source (e.g. LED or laser) is used to deliver white light.

In another configuration, the wavelength conversion layer 413, 513, 613, 713, 813 and 913 consists of one or more layers of different types of phosphors (e.g. red, green and blue phosphors) stacked on top of each other or placed next to each other.

In another configuration, a diffusing agent is added to the wavelength conversion material 413, 513, 613, 713, 813 and 913. Alternatively, a transmissive diffuser (rough surface, micro-lens array, micro/nano structured material, a lens, tapered cone made of glass or other type of transparent material) can be provided in the path of the light beam received from the light source in order to increase its cone angle.

In another configuration, the whole wavelength conversion layer 413, 513, 613, 713, 813 and 913 is patterned into one dimensional or two dimensional structures (e.g. prisms, pyramids, squares, rectangles). Such patterns can be large (sub-millimeters to several millimeters in size) or small (few to tens of microns in size). Rather than filling the whole interior volume, the wavelength conversion layer 413, 513, 613, 713, 813 and 913 can cover the interior or exterior surface of a light guide (e.g. internal surfaces of entrance face, exit face and sidewalls) 420, 520, 620 and 720 partly or completely.

In another configuration, the surface of the wavelength conversion layer 413, 513, 613, 713, 813 and 913 is patterned into one dimensional or two dimensional structures (e.g. prisms, pyramids, squares, rectangles). Such patterns can be large (sub-millimeters to several millimeters in size) or small (few to tens of microns in size). The patterning of the surface or whole depth of the wavelength conversion layer 413, 513, 613, 713, 813 and 913 provides a more efficient absorption of excitation light and collection of converted light.

In another configuration, the light source 410 consists of more than one light source (e.g. lasers, LEDs or combination of both) coupled to at least one clear opening 416, 516, 616, and 716. The coupling can be done through the use of dichroic mirrors that combine the multiple light beams having same or different wavebands (e.g. UV, near UV and Blue) from multiple sources (e.g. lasers) into a single light beam. Alternatively, the light beams can be inputted directly (or through a lens or group of lenses) into the clear opening where each light beam has its own tilt angle with respect to the optical axis of the illumination assembly. For example, it is possible to use a focusing lens to focus light from two or more lasers (array of lasers or micro-lasers) having same or different wavelengths into at least one clear opening 416, 516, 616, and 716. In case of having multiple clear openings, each clear opening receive light from at least one laser (or micro-laser) in the array. Examples of the light source 410 include a semiconductor light emitting device having a peak emission wavelength ranging from 360 nm to 500 nm, a laser diode device having a peak emission wavelength in the vicinity of 405 nm or in the vicinity of 445 nm. The source 410 can be GaN-based laser diode or GaN-based light emitting diode.

FIGS. 5A-5D show cross-sectional views of other illumination systems 1500, 1600, 1700 and 1800. Illumination systems 1500, 1600, 1700 and 1800 combine at least one illumination assembly 500, 600, 700, 800, 900, 1000, 1100, and 1200 of FIGS. 2-4 with a solid light guide 1412 and 1512. Illumination system 1500 of FIG. 5A consists of illumination assembly 1410, solid light guide 1412, optional optical element 1414, optional collimation plate 1415 and optional collimation element 1416. Illumination assembly 1410 can be selected from illumination assemblies 500, 600, 700, 800, 900, 1000, 1100, and 1200 of FIGS. 2-4. Solid light guide 1412 has a reflective coating 1411 applied to its entrance aperture except for an input aperture 1412i that receives light from illumination assembly 1410 and has a reflective coating 1413 applied to its exit aperture except for an output aperture 1412o that delivers light to an optional optical element 1414, optional micro-guide array 1415 and collimation element 1416. Collimation element 1416 can be a lens, group of lenses, solid or hollow compound parabolic concentrator (CPC), solid or hollow light guide with tapered sidewalls, a CPC or a tapered solid or hollow light guide followed by a hollow/solid light guide with straight sidewalls. The function of collimation element 1416 is to at least collimate part of the light entering its input aperture. This means that light delivered by the collimation element 1416 is more collimated than light received by the collimation element 1416.

Figure 5A:
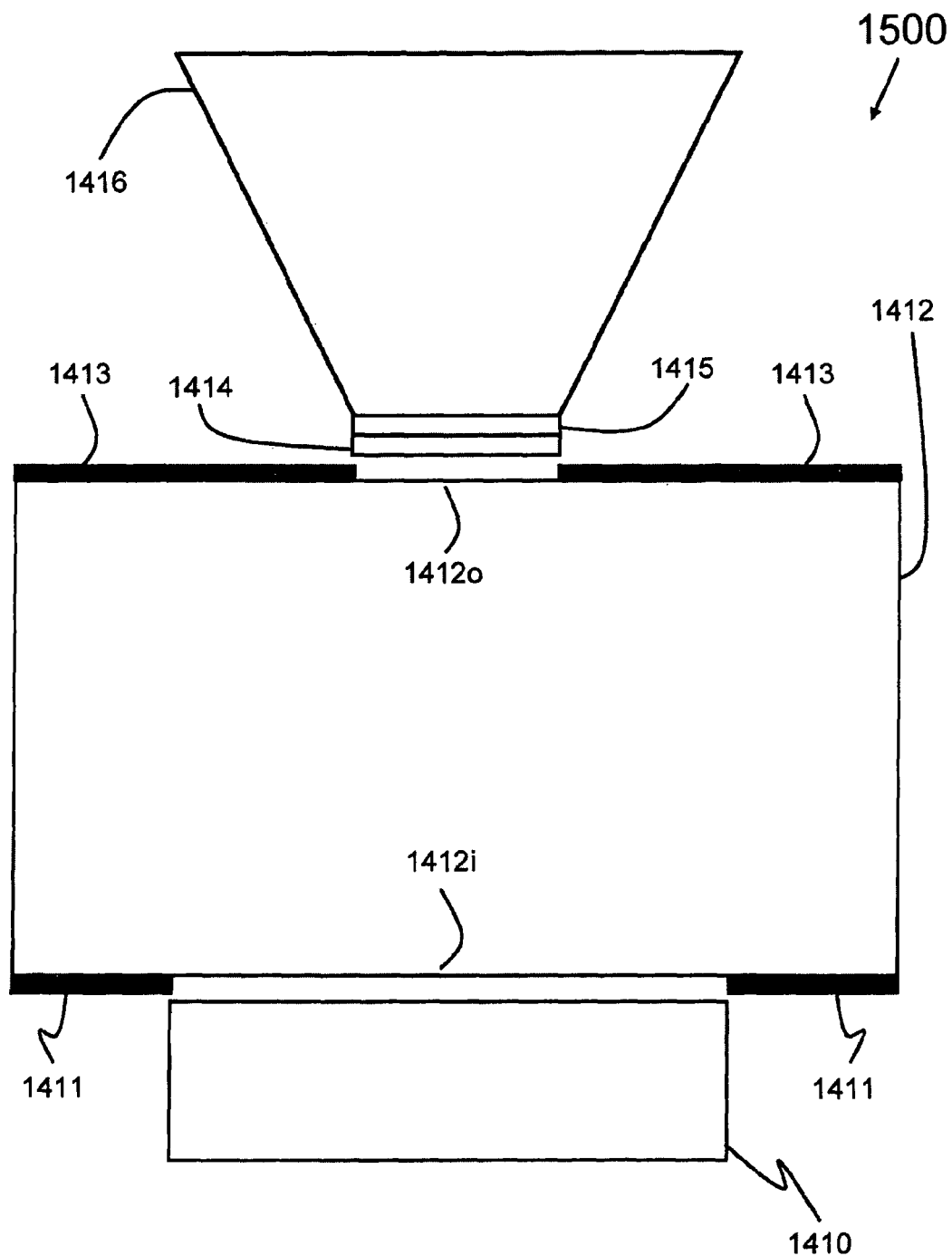
FIG. 5A is a cross-sectional view of an illumination system utilizing a solid light guide with a reflective coating applied to parts of its entrance and exit faces.
Figure 5B:
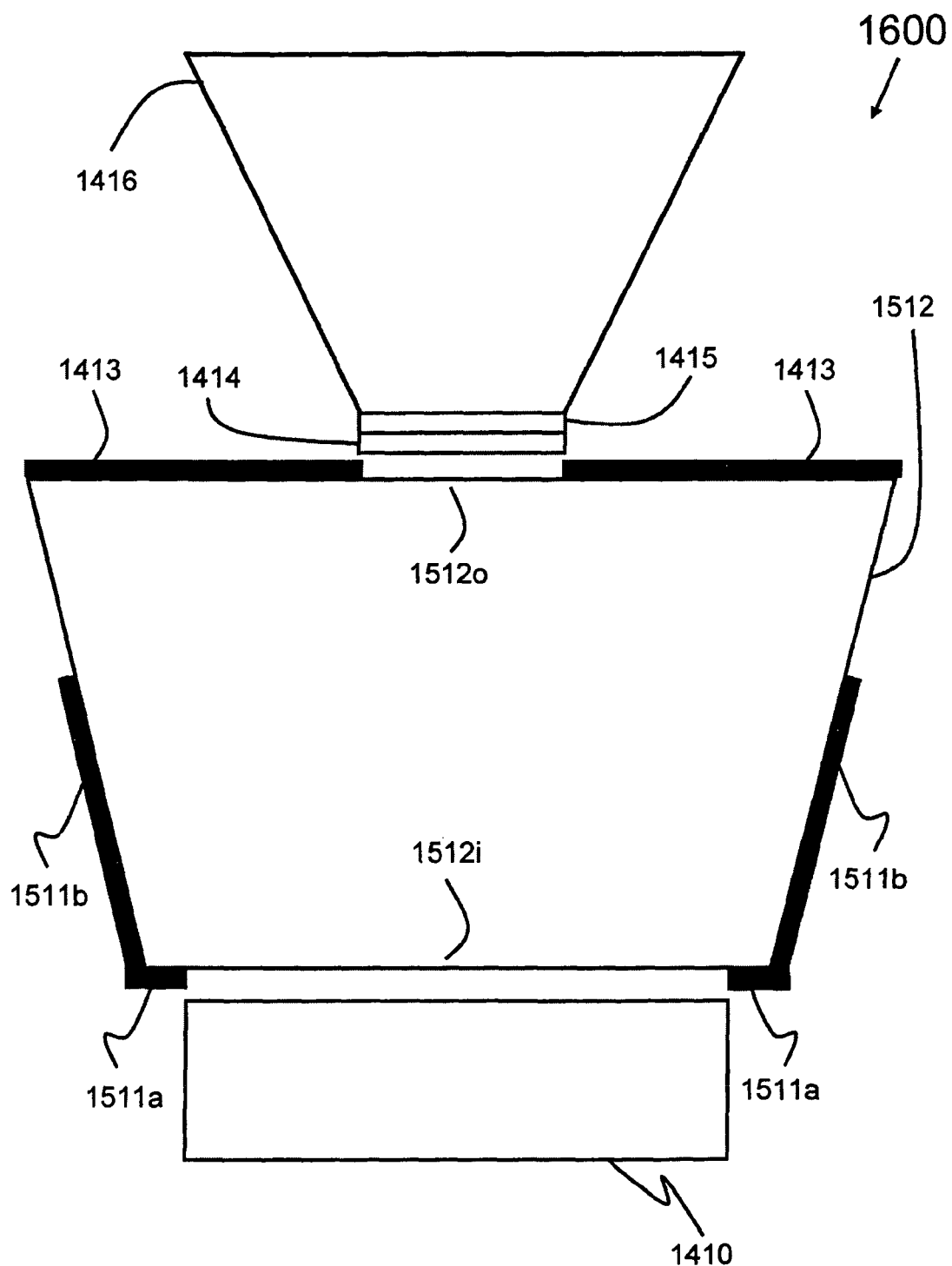
FIG. 5B is a cross-sectional view of an illumination system utilizing a tapered solid light guide with a reflective coating applied to parts of its sidewalls, its entrance face and exit face.

Illumination system 1600 of FIG. 5B consists of illumination assembly 1410, solid light guide 1512, optional optical element 1414, optional micro-guide array 1415 and optional collimation element 1416. Illumination assembly 1410 can be selected from illumination assemblies 500, 600, 700, 800, 900, 1000, 1100, and 1200 of FIGS. 2-4. Solid light guide 1512 has a reflective coating 1511b applied to part of its tapered sidewalls, a reflective coating 1511a applied to its entrance aperture except for an input aperture 1512i that receives light from illumination assembly 1410, and a reflective coating 1413 applied to its exit aperture except for an output aperture 1512o that delivers light to an optional optical element 1414, optional collimation plate 1415 and optional collimation element 1416.

Each of illumination systems 1500 and 1600 can have more than one input aperture 1412i, 1512i and more than output aperture 1412o, 1512o.

Figure 5C:
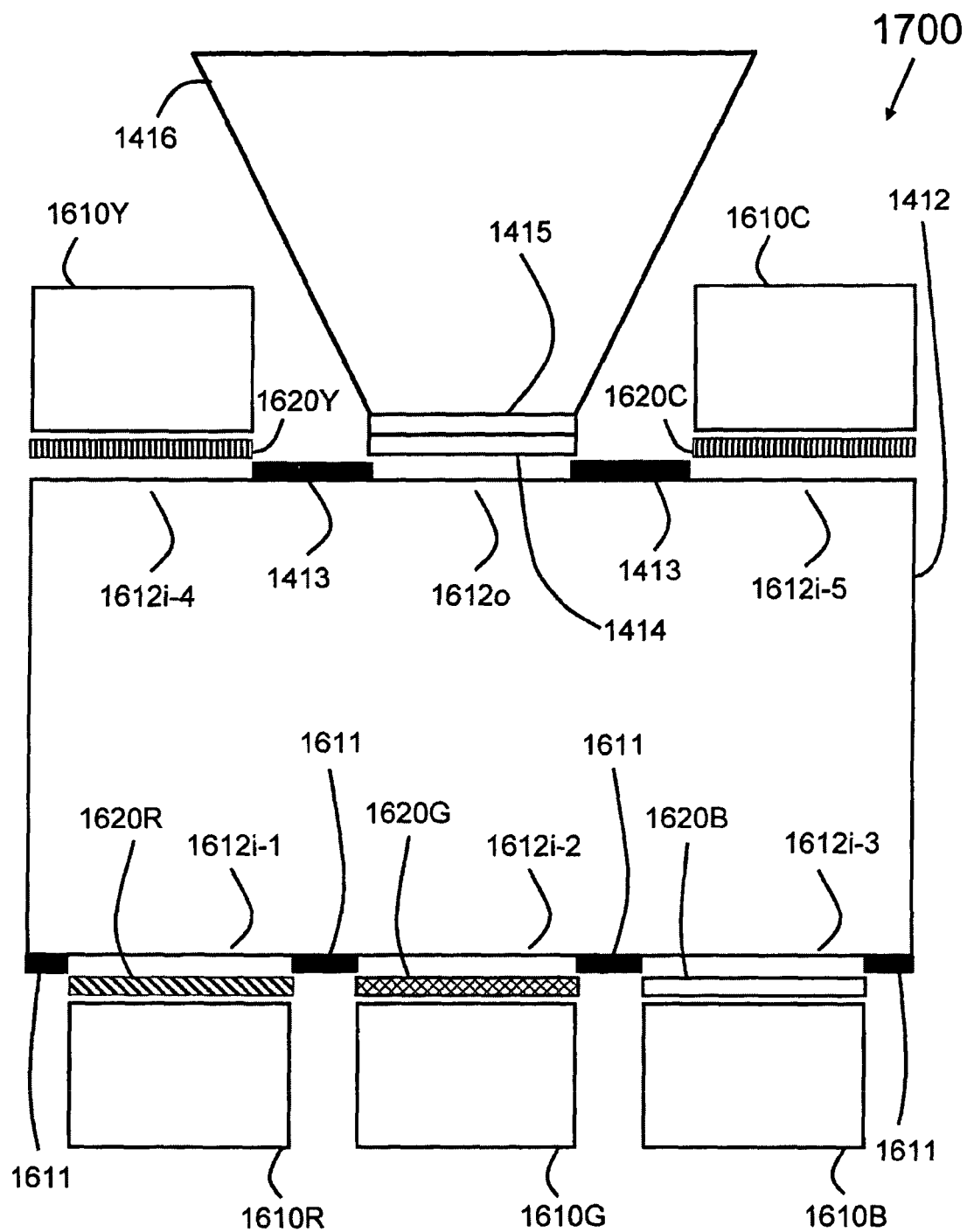
FIG. 5C is a cross-sectional view of an illumination system utilizing optical elements and a solid light guide with a reflective coating applied to parts of its entrance and exit faces. Optical elements and associated illumination assemblies are located at the entrance and exit faces of the light guide.

Illumination system 1700 of FIG. 5C utilize five illumination assemblies 1610R, 1610Y, 1610G, 1610B and 1610C that use five different wavelength conversion materials (e.g. red, yellow, green. blue and cyan phosphors) to deliver light in five different wavebands (e.g. red, yellow, green. blue and cyan wavebands). Each of illumination assemblies 1610R, 1610Y, 1610G, 1610B and 1610C can be selected from illumination assemblies 500, 600, 700, 800, 900, 1000, 1100, and 1200 of FIGS. 2-4. Illumination system 1700 consists of solid light guide 1412, optional optical element 1414, optional collimation plate 1415, optional collimation element 1416, optional optical elements 1620R, 1620Y, 1620G, 1620B and 1620C, and illumination assemblies 1610R, 1610Y, 1610G, 1610B and 1610C. Solid light guide 1412 has a reflective coating 1611 applied to its entrance aperture except for input apertures 1612*i*-1, 1612*i*-2 and 1612*i*-3 that receive light from illumination assemblies 1610R, 1610G and 1610B and has a reflective coating 1511*b* applied to its exit aperture except for input apertures 1612*i*-4 and 1612*i*-5 that receive light from illumination assemblies 1610Y and 1610C and an output aperture 1612*o* that delivers light to an optional optical element 1414. Each of optical elements 1620R, 1620Y, 1620G, 1620B and 1620C transmits light received from corresponding illumination assembly 1610R, 1610Y, 1610G, 1610B and 1610C and reflects light in other wavebands (i.e. light received from other illumination assemblies 1610R, 1610Y, 1610G, 1610B and 1610C). For example, optical element 1620R is an optical coating that transmits light in a first waveband (e.g. red light) and reflects light in other wavebands (e.g. yellow, green, cyan and blue wavebands) and optical element 1620G is an optical coating that transmits light in a second waveband (e.g. green waveband) and reflects light in other wavebands (e.g. red, yellow, cyan and blue wavebands). While optical element 1620B is an optical coating that transmits light a third waveband (e.g. blue waveband) and reflects light in other wavebands (e.g. red, yellow, green and cyan wavebands). These optical elements 1620R, 1620Y, 1620G, 1620B and 1620C minimize optical losses by preventing light of a certain waveband (e.g. red) from being absorbed by the wavelength conversion materials (e.g. yellow, green, cyan and blue phosphors) that generate light of other wavebands (e.g. yellow, green, cyan and blue). In addition, these optical elements 1620R, 1620Y, 1620G, 1620B and 1620C minimize optical losses by reducing the number of optical reflections within the illumination system 1700 and by reducing light leakage through the clear openings of illumination assemblies 1610R, 1610Y, 1610G, 1610B and 1610C. For example, optical element 1620R reflects light within yellow, green, cyan and blue wavebands in a single reflection. However, without optical element 1620R, light within yellow, green, cyan and blue wavebands will enter illumination assembly 1610R and experience multiple reflections and losses before it gets directed back toward the output aperture 1612*o*, thus, leading to higher optical losses. In general, optical losses increase as the number of optical reflections is increased. It is also possible to have a low-refractive index layer applied directly to at least one of the input apertures 1612*i*-1, 1612*i*-2, 1612*i*-3, 1612*i*-4 and 1612*i*-5 of illumination system 1700.

Figure 5D:
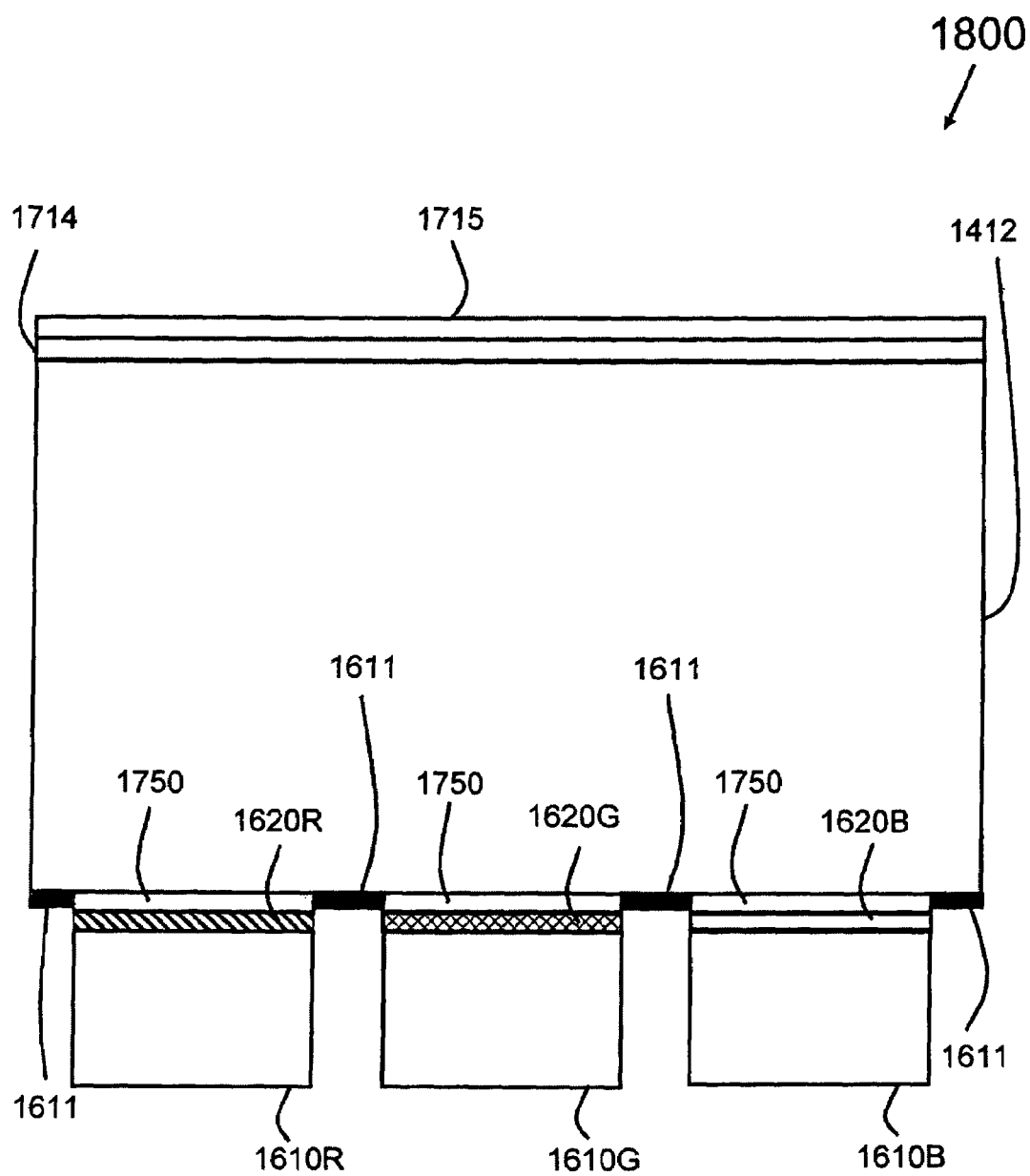
FIG. 5D is a cross-sectional view of an illumination system utilizing optical elements and a solid light guide with a reflective coating applied to parts of its entrance face. Optical elements and associated illumination assemblies are located at the entrance face of the light guide.

Illumination system 1800 of FIG. 5D utilize a solid light guide 1412, an optional optical element 1714, an optional collimating plate, 1715, an optional low-refractive index layer 1750, optional optical elements 1620R, 1620G, and 1620B, and three illumination assemblies 1610R, 1610G, and 1610B that utilize three wavelength conversion materials (e.g. red, green and blue phosphors) to deliver light in three wavebands (e.g. red, green and blue wavebands). Each of illumination assemblies 1610R, 1610G, and 1610B can be selected from illumination assemblies 500, 600, 700, 800, 900, 1000, 1100, and 1200 of FIGS. 2-4. The solid light guide 1412 has a reflective coating 1611 applied to its entrance aperture except for areas that receive light from illumination assemblies 1610R, 1610G, and 1610B. The low-refractive index layer 1750 can be applied directly to the areas of solid light guide 1412 that receive light from illumination assemblies 1610R, 1610G, and 1610B. Alternatively, low-refractive index layer 1750 can be located any where between areas of solid light guide 1412 that receive input light and illumination assemblies 1610R, 1610G, and 1610B.

Optical element 417, 517, 817 and 917, 1414 and 1714 of FIGS. 2-5 can be a reflective polarizer, dichroic mirror, a dichroic cube, diffractive optical element, micro-refractive element, brightness enhancement film, hologram, a filter that blocks (absorbs and/or reflects) UV or near UV light, a photonic crystal or a combination of two or more of these elements. The manufacturing of photonic crystals is described by Erchak et al. in U.S. Pat. No. 6,831,302 B2, which is incorporated herein by reference. The different structures and operation of collimating plate 1415 and 1715 are discussed below in connection with FIGS. 7-10.

Illumination systems 1500, 1600, 1700 and 1800 have the advantage of utilizing total internal reflection at the sidewalls of solid light guides 1412 and 1512 and, thus, providing less optical losses when compared to illumination systems that apply metallic and/or dielectric reflective coatings to the sidewalls of hollow or solid light guides. As the amount of recycled light within a system is increased, more optical reflections occur resulting in more optical losses especially when reflections occur via metallic and/or dielectric coatings. Since reflections via total internal reflection have no optical losses, utilizing solid light guides 1412 and 1512 for light recycling leads to lower optical losses as long as the absorption losses of the solid light guide materials 1412 and 1512 are low enough. Example of such materials is the commercially available UV grade fused silica.

Illumination systems 1500, 1600, 1700 and 1800 can utilize any number of illumination assemblies with different wavelength conversion layers (e.g. two, three, four, five or more types of phosphors) and each illumination assembly 1610R, 1610Y, 1610G, 1610B and 1610C has an optical element 1620R, 1620Y, 1620G, 1620B and 1620C for enhancing optical efficiency and reducing optical losses. In addition, illumination system 1500, 1600, 1700 and 1800 can utilize a low-refractive index layer applied to the input aperture 1412*i*, 1512*i*, 1612*i*-1, 1612*i*-2 and 1612*i*-3 or located next or in close proximity to the input aperture 1412*i*, 1512*i*, 1612*i*-1, 1612*i*-2 and 1612*i*-3.

Illumination systems 1500, 1600, 1700 and 1800 can utilize hollow light guides with reflective surfaces rather than solid light guides 1412 and 1512. Such hollow light guides can have various shapes, variations and arrangement including shapes, variations and arrangements described by Beeson et al. in U.S. Pat. No. 7,040,774. In this case, input light can be received through one or more input apertures located any where on the surface of the light-recycling envelope excluding the surface area of the output aperture.

A low-refractive index layer (e.g. air or nano-porous $SiO_2$) may be placed between a wavelength conversion material (e.g. phosphor) and a reflective coating. The reflective coating can be a dielectric mirror, metallic mirror, dichroic mirror, a dichroic cube, or a diffractive optical element or a combination of two or more of these elements. For example, all illumination systems discussed by Nagahama et al. in U.S. patent application Ser. No. 11/702,598 (Pub. No.: US20070189352) can utilize such a low-refractive index layer between the wavelength conversion material and the reflective surfaces located below and above (and possibly around the edges of) the wavelength conversion material (See FIG. 5E and discussion below). All illumination systems discussed by Beeson et al. in U.S. Pat. No. 7,040,774 can utilize such a low-refractive index layer between the wavelength conversion material and the reflective surface of the light-recycling envelope (See FIG. 5F and discussion below). Also, all illumination systems discussed by Harbers et al. in U.S. Pat. Nos. 7,070,300 and 7,234,820 can utilize such a low-refractive index layer between the wavelength conversion material and the reflective surfaces located below and above (and possibly around the edges of) the wavelength conversion material. Placing a low-refractive index layer between wavelength conversion material and adjacent reflective coating results in lower optical losses and enhanced optical efficiency especially when significant light recycling occurs.

A reflective optical element may be placed between a light source and an input aperture of an illumination system so that it transmits the light received from the light source (LED or laser) and reflects at least a portion of light within wavelength ranges (e.g. the converted light) different from the wavelength range of the light source back in the opposite direction. The reflective optical element can be placed directly on the light source surface or placed at the input aperture (which receives input light) of an illumination system. Alternatively, the reflective optical element can be deposited directly on the surface of the light source (e.g. the surface of a LED) or deposited directly on the entrance or exit face of a light guide (or fiber) transmitting light from the light source to the input aperture of an illumination system. Reflecting part or most of the converted light back and preventing it from entering the light source surface leads to lower optical losses. High optical losses usually occur within a light source especially LEDs. The reflective optical element can be a dielectric coating (e.g. dichroic mirror or dichroic cube) that transmits light in one wavelength range and reflects light within other wavelengths.

Figure 1A:
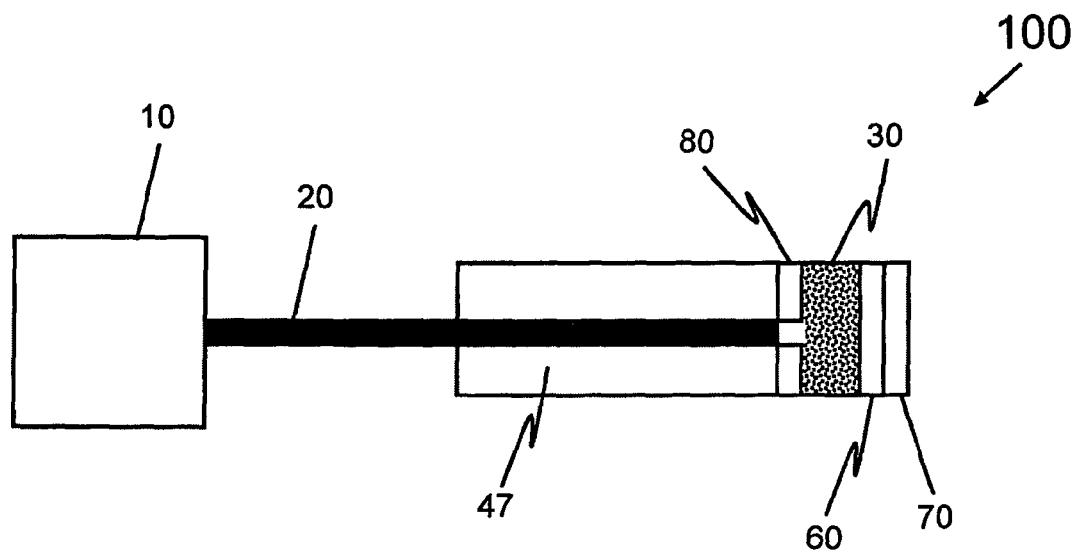
FIG. 1A is a cross-sectional view of a prior art illumination source.
Figure 5E:
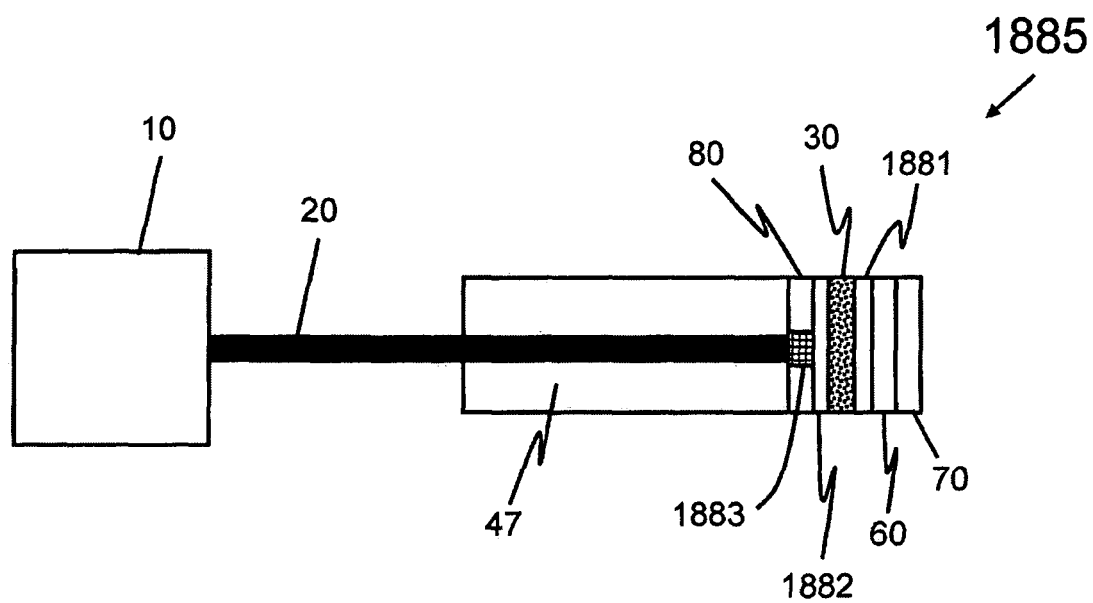
FIG. 5E shows a cross-sectional view of a light emitting device utilizing a low-refractive index layer, a reflective optical element and a fiber.

FIG. 5E shows a cross-sectional view of a light emitting device 1885 utilizing a low-refractive index layer 1881 and 1882 located between a wavelength conversion material 30 and reflective surfaces 60 and 80. In addition, light emitting device 1885 has a reflective optical element 1883 located after the exit face of the fiber. This reflective optical element 1883 transmits the light received from the fiber toward a wavelength conversion material 30 and reflects at least a portion of converted light in the opposite direction and back toward the wavelength conversion material 30. Elements 10, 20, 47, 80, 30, 60 and 70 of this device 1885 are the same as the elements 10, 20, 47, 80, 30, 60 and 70 of device 100, which is described in connection with FIG. 1A. Light emitting device (or illumination system) 1885 can have various arrangements including all arrangements described by Nagahama et al. in U.S. patent application Ser. No. 11/702,598 (Pub. No.: US20070189352).

Figure 1B:
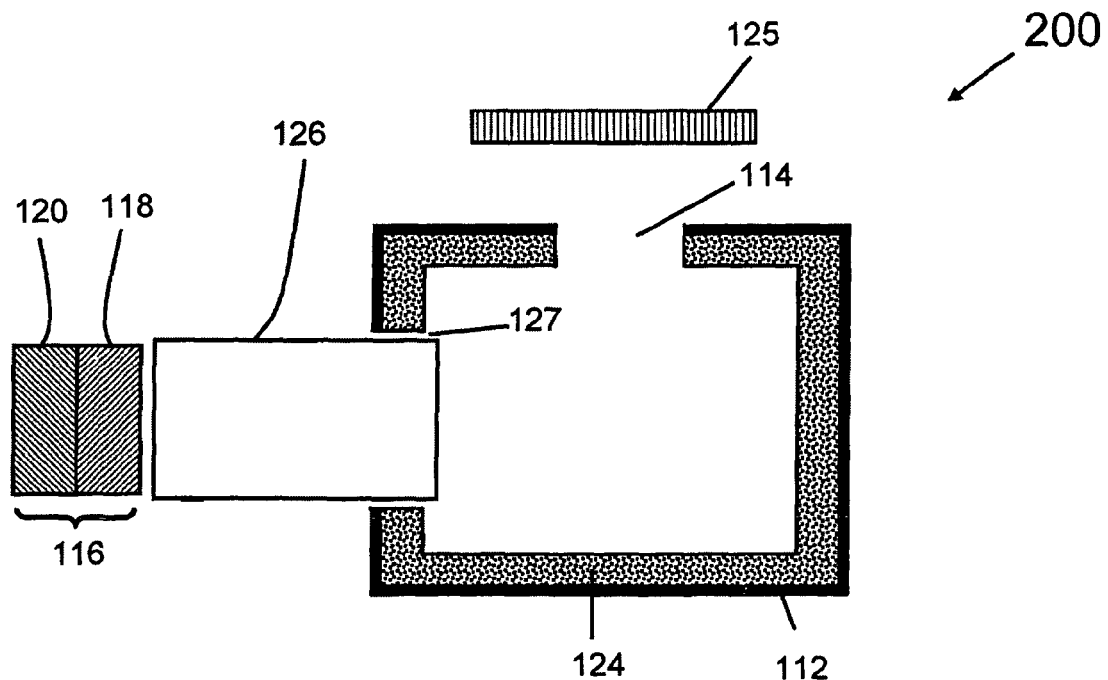
FIG. 1B is a cross-sectional view of a prior art illumination system utilizing light recycling and a reflective envelope to provide light with enhanced brightness.
Figure 1C:
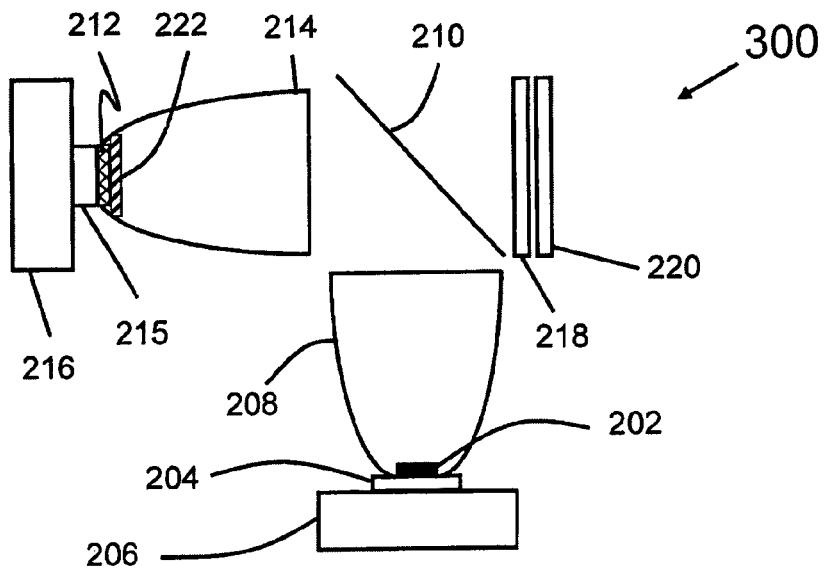
FIG. 1C is a cross-sectional view of a prior art illumination system utilizing remote phosphor for light conversion.
Figure 1D:
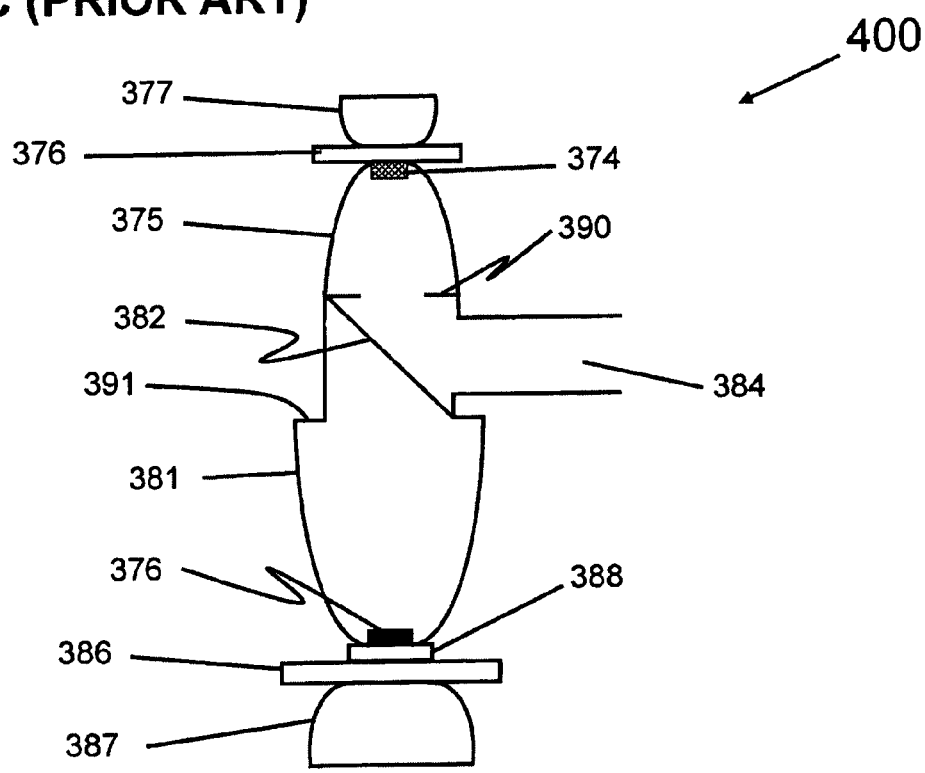
FIG. 1D is a cross-sectional view of a prior art illumination system utilizing remote phosphor and light recycling via a small output aperture to provide light with enhanced brightness.
Figure 5F:
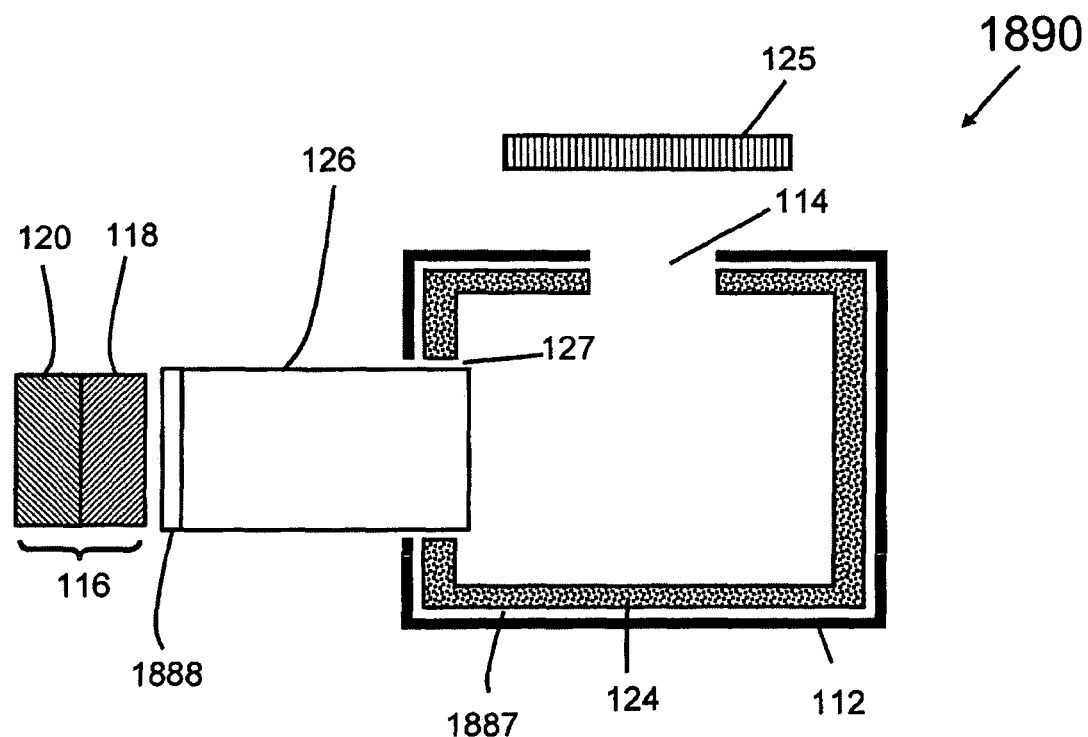
FIG. 5F shows a cross-sectional view of an illumination system utilizing a light emitting diode, a low-refractive index layer, an optional reflective optical element and a light-recycling envelope.

FIG. 5F shows a cross-sectional view of an illumination system 1890 utilizing a low-refractive index layer 1887 located between a wavelength conversion material 124 and reflective surfaces of light-recycling envelope 112. In addition, illumination system 1895 has a reflective optical element 1888 located at the entrance face of light guide 126. This reflective optical element 1888 transmits the light received from a light emitting diode (LED) 116 toward a wavelength conversion material 124 and reflects at least a portion of converted light (and other wavelengths that may exist in the light-recycling envelope 112 due to the use of other lasers or LEDs having wavelengths different from LED 116) in the opposite direction and back toward the light-recycling envelope 112. Elements 112, 114, 116, 118, 120, 124, 125, 126 and 127 of illumination system 1890 are the same as the elements 112, 114, 116, 118, 120, 124, 125, 126 and 127 of illumination system 200, which is described in connection with FIG. 1B. Illumination system 1890 can have various architectures and various types/shapes of light recycling envelopes including shapes, variations and arrangements of LED-based illumination systems described by Beeson et al. in U.S. Pat. No. 7,040,774.

Figure 5G:
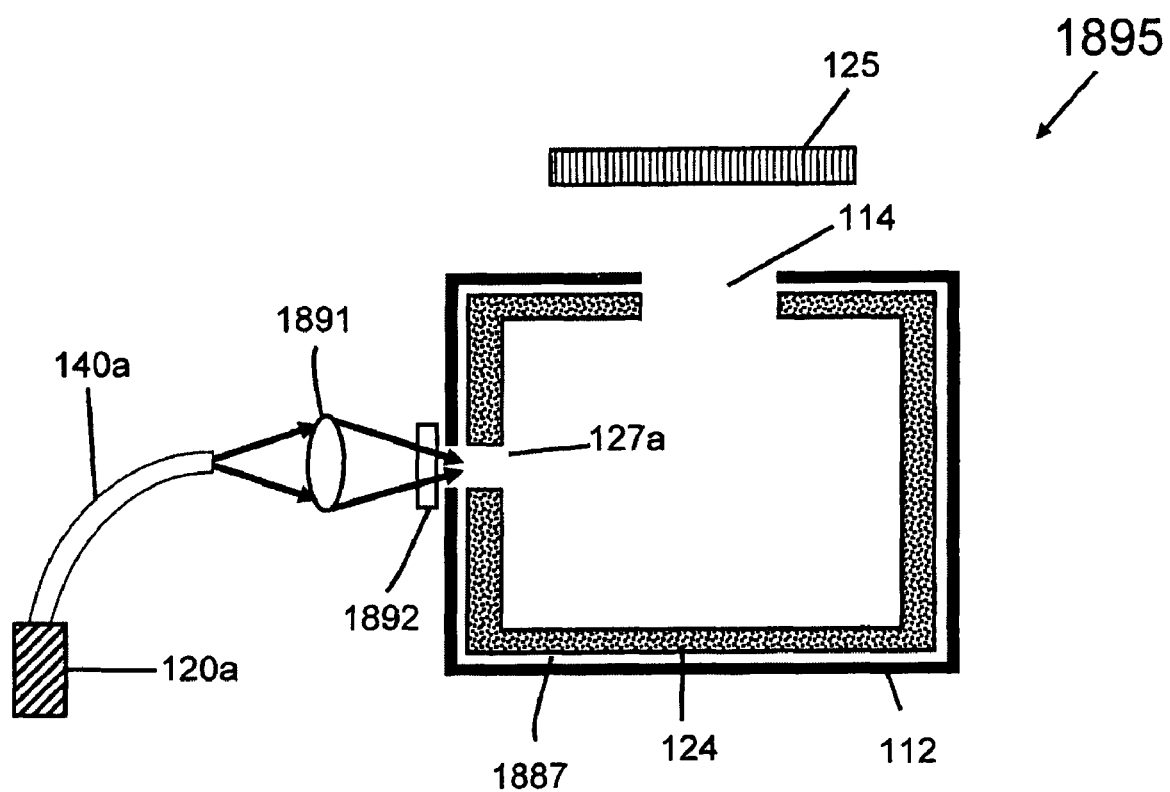
FIG. 5G shows a cross-sectional view of an illumination system utilizing a laser, an optional lens, a low-refractive index layer, an optional reflective optical element and a light-recycling envelope.

FIG. 5G shows a cross-sectional view of an illumination system 1895 utilizing a laser 120a, an optional lens 1891, an optional reflective optical element 1892, and a low-refractive index layer 1887 located between a wavelength conversion material 124 and reflective surfaces of light-recycling envelope 112. The reflective optical element 1892 transmits the light received from a laser 120a through fiber 140a and lens 1891 toward a wavelength conversion material 124 and reflects at least a portion of converted light (and other wavelengths that may exist in the light-recycling envelope 112 due to the use of other lasers or LEDs having wavelengths different from that of laser 120a) in the opposite direction and back toward the light-recycling envelope 112. The laser light can be coupled directly to the lens 1891 and without using a fiber 140a. The use of lens 1891 allows the coupling a laser 120a to the light-recycling envelope 112 through a small opening (i.e. input aperture) 127a, thus, minimizing optical losses. In this case, the reflective optical element 1892 can be eliminated without significant impact on the optical efficiency. Illumination system 1895 can have various architectures and various types/shapes of light recycling envelopes including shapes, variations and arrangements of laser-based illumination systems described by Beeson et al. in U.S. Pat. No. 7,040,774.

Figure 6A:
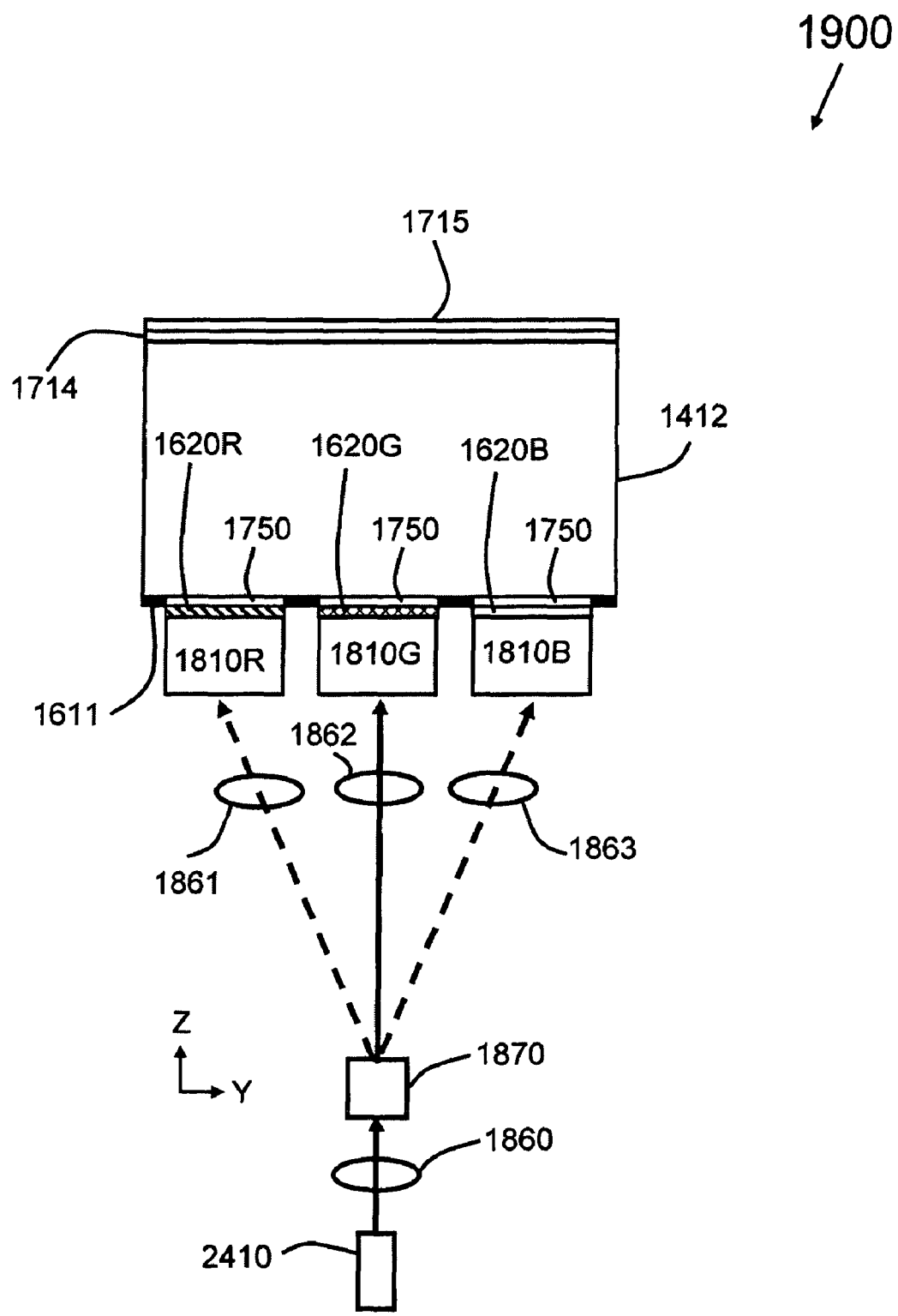
FIG. 6A is a cross-sectional view of an illumination system utilizing optical elements, a solid light guide and a transmissive deflector.
Figure 6B:
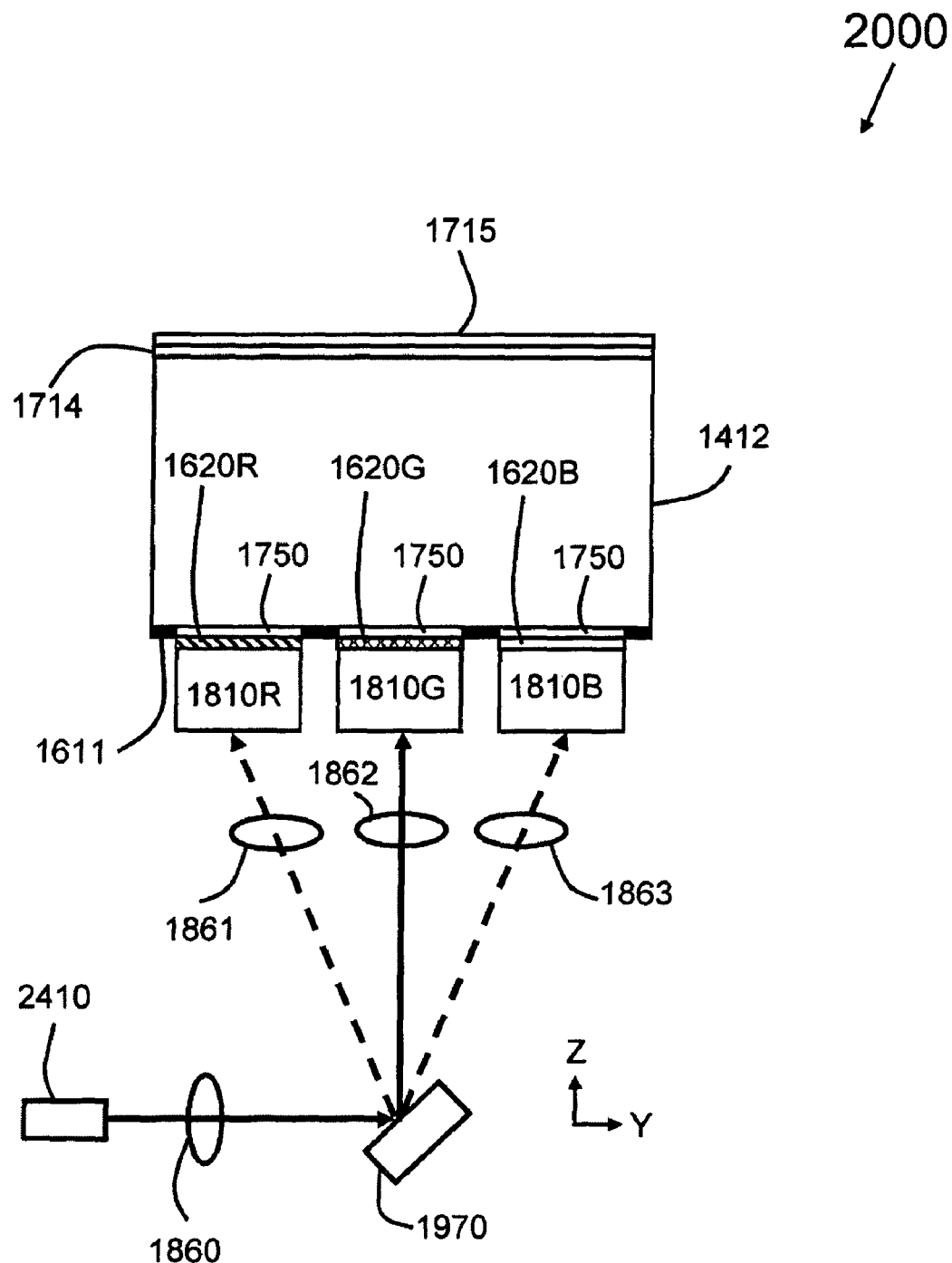
FIG. 6B is a cross-sectional view of an illumination system utilizing optical elements, a solid light guide and a reflective deflector.

FIGS. 6A and 6B show cross-sectional views of illumination systems 1900 and 2000. Illumination systems 1900 and 2000 utilize transmissive and reflective deflectors 1870 and 1970, respectively, as well as a single light source 2410 for the sequential excitation of the wavelength conversion materials of three illumination assemblies 1810R, 1810G, and 1810B. Illumination systems 1900 and 2000 consist of an optional solid light guide 1412, an optional optical element 1714, an optional collimating plate 1715, optional lenses 1860, 1861, 1862 and 1863, optional optical elements 1620R, 1620G and 1620B, optional low-refractive index layer 1750, optional reflective coating 1611, deflectors 1870 and 1970 and three illumination assemblies 1810R, 1810G and 1810B that utilize three wavelength conversion materials (e.g. red, green and blue phosphors) to deliver light in three wavebands (e.g. red, green and blue wavebands). The function of the transmissive and reflective deflectors 1870 and 1970 is to sequentially deflect or switch the light beam received from the source 2410 between the clear openings of illumination assemblies 1810R, 1810G, and 1810B. The duty cycle of the light source can be synchronized with the deflector movement to control the output light of illumination system 1900 and 2000. The sequence of switching the source light between various illumination assemblies, amount of electrical power supplied to light source and time spent in inputting light to each illumination assembly can be changed as needed at any time during the operation. At least one photo-detector can be added to any of the illumination assemblies and systems of this disclosure to sense the amount of outputted light by an illumination assembly or system (e.g. a photo-detector per wavelength range). A feedback signal is then used to adjust the amount of electrical power supplied to a light source and time spent in inputting light to an illumination assembly in order to deliver a certain amount of light at a given time for a given application according to a selected time sequence.

A deflector is a device capable of changing the path of a light beam, moving a light beam from one location to another while maintaining its path, or a combination of both (i.e.

changing the path of a the light beam and moving the light beam). For example, a light source can be rotated physically to change the path of its light beam, subjected to a translational movement (with no rotational movement) to change the location of its light beam, or subjected to a combination of rotational and translational movements.

The transmissive and reflective deflector 1870 and 1970 can be a holographic scanner, an acousto-optic deflector, an electro-optic deflector, a galvanometer scanner, a rotating polygonal mirror, thermo-optic deflector, a semiconductor optical amplifier switch or a mechanical switch. Example of a mechanical switch include a mirror that moves in and out of an optical path in order to provide the switching or deflection function, a directional coupler that couples light from an input port to different output ports by bending or stretching a fiber in the interaction region, an actuator that tilts or moves the output end of a fiber between different output ports, an actuator that tilts or moves the light source itself to provide the switching function, and a mirror that is magnetically, piezo-electrically, electro-magnetically, or thermally actuated. An electro-optic switch utilizes the change in the refractive index of an electro-optic material (e.g. Lithium niobate) as a function of applied voltage in order to provide the switching. A thermo-optic switch utilizes the change in the refractive index of a material as a function of temperature in order to provide the switching (e.g. Mach-Zehnder interferometers). A semiconductor optical amplifier switch can be used as on-off switch by varying the bias voltage applied to the device. When the bias voltage is applied the device amplifies the input signal, however, when the bias voltage is reduced no population inversion occurs and the device absorbs input signal.

Figure 6C:
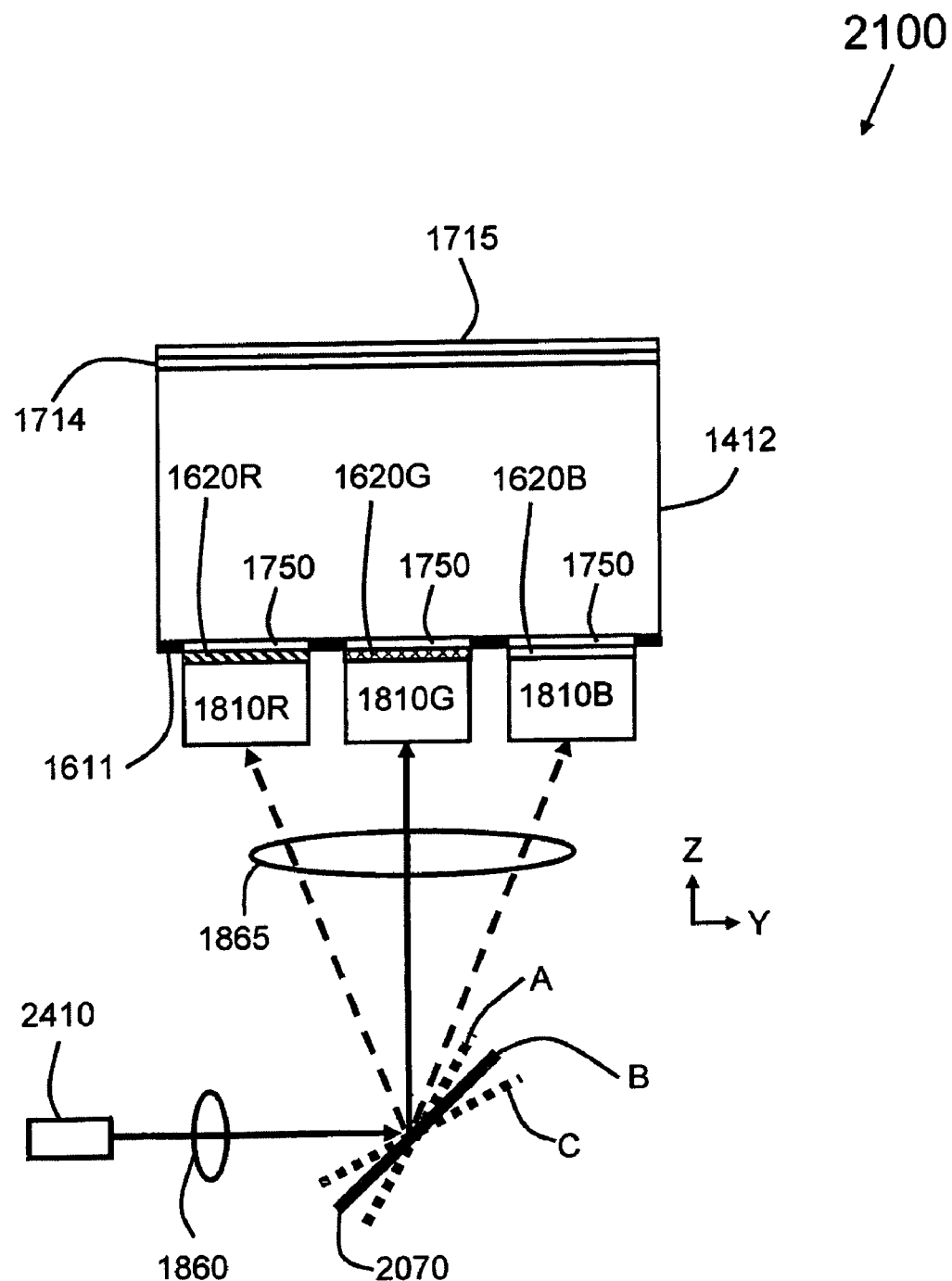
FIG. 6C is a cross-sectional view of an illumination system utilizing optical elements, a solid light guide and a reflective mirror-based deflector.

In addition, a deflector can be an electrically, magnetically, piezo-electrically, electro-magnetically, or thermally actuated micro-mirror. Examples of such micro-mirrors include micro-electro-mechanical system (MEMS) based micro-mirrors. Micro-mirrors are integrated devices where the micro-mirror and actuator are made together as an integrated device using same fabrication process while conventional mirrors utilize external actuators that are made separately and then get assembled together with the mirrors. Each of the optional lenses 1860, 1861, 1862 and 1863 can be a single lens or set of lenses, which are used, for example, to focus the light beam. As shown in FIG. 6C, the three lenses 1861, 1862 and 1863 can be replaced by one set of lenses 1865 that consists of one or more lenses. The solid light guide 1412, the optional optical element 1714, the optional collimating plate 1715, the optional optical elements 1620R, 1620G and 1620B and the optional reflective coating 1611 have been described earlier in connection with illumination systems 1700 and 1800 of FIGS. 5C-5D. Each of illumination assemblies 1810R, 1810G and 1810B can be selected from illumination assemblies discussed in this disclosure such as illumination assemblies 500, 600, 700, 800, 900, 1000, 1100, and 1200 of FIGS. 2-4 excluding the light source 410 associated with each of these illumination assemblies 500, 600, 700, 800, 900, 1000, 1100, and 1200.

A deflector 1870 can be used to scan a light beam between two or more (e.g. three, four, five, six, etc.) types of wavelength conversion materials. The light beam can interact with the wavelength conversion materials directly or transmitted to the wavelength materials through other means (e.g. light guide, optical fiber, diffuser, mirror, light-recycling envelope, or optical coating). Such wavelength conversion materials can be arrayed next to each other or in any selected configuration (e.g. circular, square, oval, triangular, rectangular or irregular). The wavelength conversion materials can be closely spaced or separated from neighboring materials by a selected distance. The wavelength conversion material can be placed on a reflective surface (e.g. a mirror with a flat surface, light-recycling envelope with reflective surfaces, or a mirror with any shape) with a low-refractive index layer in between. Alternatively, the wavelength conversion material can be located on a reflective polarizer, dichroic mirror, a dichroic cube, diffractive optical element, micro-refractive element, brightness enhancement film, hologram, a filter that blocks (absorbs and/or reflects) a certain wavelength, a photonic crystal or a combination of two or more of these elements. For example, the wavelength conversion material can partly or completely fill a hollow light guide having internal (or external) reflective surfaces with an optional low-refractive index layer located between the wavelength conversion material and the reflective surfaces. Alternatively, the wavelength conversion material can partly or completely cover the internal surfaces (and not the whole interior volume) of a hollow light guide having internal (or external) reflective surfaces with an optional low-refractive index layer located between the wavelength conversion material and the reflective surfaces.

A deflector 1870 can be used to scan a light beam between two or more (e.g. three, four, five, six, etc.) illumination assemblies or systems with each having at least one wavelength conversion material. Examples of such illumination assemblies and systems include illumination systems discussed by Nagahama et al. in U.S. patent application Ser. No. 11/702,598 (Pub. No.: US20070189352), illumination systems discussed by Beeson et al. in U.S. Pat. No. 7,040,774 and illumination systems discussed by Harbers et al. in U.S. Pat. Nos. 7,070,300 and 7,234,820. It is also possible to use a deflector to switch light beam between two or more wavelength conversion materials in any of the illumination systems discussed by Harbers et al. in U.S. Pat. Nos. 7,070,300 and 7,234,820 assuming that that each of such illumination systems has two or more wavelength conversion materials.

The laser source 2410 and the deflector 1870, 1970 and 2070 can be oriented at any angle with respect to the optical axis (i.e. Z-axis) of the illumination system 1900, 2000 and 2100. For example, the laser source 2410 and the deflector 1870 are both aligned with the optical axis (i.e. Z-axis) of the illumination system 1900 as shown in FIG. 6A. In FIGS. 6B and 6C, the laser source 2410 is oriented at 90 degrees with the optical axis (i.e. Z-axis) of the illumination systems 2000 and 2100 and the deflectors 1970 and 2070 are oriented at 45 degrees with the optical axis (i.e. Z-axis) of the illumination systems 2000 and 2100.

FIG. 6C shows a cross-sectional view of illumination system 2100, which is the same as illumination system 2000 except for the use of a mirror or micro-mirror 2070 as a deflector and lens (or set of lenses) 1865. The mirror or micro-mirror 2070 tilts between positions A, B and C and the received light beam is directed between illumination assemblies 1610R, 1610G and 1610B, respectively. The light beam (and light source) can be oriented at any angle with respect to the optical axis of the illumination system 2100, which is parallel to the Z-axis.

Each clear opening in the illumination assemblies and systems disclosed herein receives a portion of the light emitted from a light source. In this case, the light emitted from a light source is divided into two or more sub-beams (using for example beam splitters) that are then coupled to two or more clear openings in an illumination assembly. It is also possible to use a deflector to switch a light beam (or sub-beam) in and out of a clear opening or to switch a light beam between two or more clear openings according to any selected sequence. The switch or deflector provides control over which type of wavelength conversion layer 413, 513, 613, 713, 813 and 913 is excited at a given time. For example, light from one laser source can be divided into three sub-beams, which are then utilized to continuously or sequentially excite three types of phosphors (e.g. red, green and blue phosphors in an illumination system 1700 and 1800) through the use of deflectors and deliver three colors for display applications. Each sub-beam can be controlled by a dedicated deflector or an optical attenuator in order to adjust or attenuate the sub-beam light and, thus, control the amount of converted light.

A deflector and a single light source can be combined with any of the illumination systems 1500, 1600 and 1700 as long as at least two of the illumination assemblies of this disclosure (excluding each dedicated light source 410 associated with each illumination assembly) are utilized in each illumination systems 1500, 1600 and 1700.

A deflector and a single light source can be combined with one or more of the illumination assemblies of this disclosure (excluding dedicated light source 410 associated with each illumination assembly). Each illumination assembly can have a wavelength conversion material with any selected type and shape.

The light guide 1412 and 1512 of illumination systems 1500, 1600, 1700, 1800, 1900, 2000 and 2100 can be a hollow or solid light guide with a reflective coating applied to its sidewalls (i.e. forming light-recycling envelope). In this case, one or more light sources (e.g. LEDs, lasers, or a combination of both) can be coupled to one or more clear openings that are located at any part of the light-recycling envelope (e.g. sidewalls, entrance face and exit face of the light guide 1412 and 1512 excluding input and output apertures). Since light guide 1412 and 1512 has an enclosed reflective surface (i.e. reflective envelope), light guide 1412 and 1512 can have any shape including shapes discussed by Beeson et al. in U.S. Pat. No. 7,040,774. When the light guide 1412 and 1512 is a hollow reflective envelope, a wavelength conversion material can be placed inside it. In addition, at least a deflector and a single light source can be combined with two or more of the illumination systems described herein.

Illumination systems 1900, 2000 and 2100 that utilize the deflector described in this disclosure has the advantage of using a single light source (e.g. a near UV laser) to excite the wavelength conversion materials (e.g. red, green and blue phosphors) of more than one illumination assembly, thus, leading to simplified illumination systems and reduced costs.

In all of the disclosed illumination systems and assemblies, the output optical power of a light source 410, 1410 and 2410 can be adjusted (by adjusting the electrical power of the light source as a function of time) to control the flux of the light source and the corresponding flux of converted light. When more than one wavelength conversion material is utilized in an illumination system (each with a corresponding light source), the color of output light (mixture of light beams from all or part of utilized wavelength conversion materials) can be adjusted as a function of time by adjusting the relative electrical powers of the light sources as a function of time. In addition, the color rendering index (a measure of the quality of the white light emitted by an illumination assembly or system when compared to a reference illumination source having a color rendering index of 100) of an illumination system 1700 and 1800 producing white light can be controlled by adjusting the relative electrical powers of the light sources utilized in the illumination system 1700 and 1800. In illumination systems 1900, 2000 and 2100 that utilize one light source 2410 with a deflector 1870, 1970 and 2070, the color of output light (which is not necessarily white light) or the color rendering index of white output light can be controlled by adjusting the electrical power of the light source as it moves from one illumination assembly 1810R, 1810G and 1810B to another 1810R, 1810G and 1810B. Illumination systems that utilize one light source with a deflector provide more stable color rendering index with time (even if output light of the light source is not controlled as a function of time) since the variation or decline of output light equally impacts the two or more wavelength conversion materials utilized in the corresponding illumination assemblies to produce white light. This is true as long as the variation or decline is a long term decline (usually happens over days, months or even years) and not a variation or decline occurring over a short period of time (e.g. sub-millisecond range).

The reflectivity of the reflective coatings used in the assemblies and system described herein are preferably at least 50%, more preferably at least 90% and most preferably at least 99% reflective.

The optically transmissive light guide 520, 720, 1412 and 1512 can be made of glass such as UV grade fused silica, which has low optical losses especially in the visible waveband. The opaque light guide 420 and 620 and the heat sink 1060 and 1160 can, for example, be made of silicon, silver, aluminum, copper, nickel, silicon carbide, zirconia, alumina, aluminum nitride, barium sulfate, carbon, stainless steel, borosilicate glass, or the like. It is preferable to use a light guide 420, 520, 620, 720, 1412 and 1512 that has a thermal expansion coefficient equal to that of the wavelength conversion layer 413, 513, 613, 713, 813 and 913 in order to prevent defects, which occur due to mismatch in the thermal expansion coefficients of the wavelength conversion layer 413, 513, 613, 713, 813 and 913 and the light guide 420, 520, 620, 720, 1412 and 1512.

The output aperture 850, 950, 1412o, 1512o and 1612o can have any shape such as a square, rectangular, circular, oval and arbitrary faceted or curved shape. The area of an output aperture can range from a fraction of 1 $mm^2$ to tens of $mm^2$ and more preferably from a fraction of 1 $mm^2$ to few $mm^2$.

A collimation element can be utilized in any of illumination assemblies 500, 600, 700, 800, 900, 1000, 1100 and 1200 and in any of illumination systems 1800, 1900, 2000 and 2100 to collimate at least part of the light exiting collimating plates 418, 518, 818, 918 and 1715. For example, illumination systems 1500, 1600 and 1700 already show such a collimation element 1416 in the cross-sectional views of FIGS. 5A-5C. The collimation element can be a lens, group of lenses, a solid compound parabolic concentrator (CPC) that guides light via total internal reflection and/or reflection, a hollow compound parabolic concentrator (CPC) that guides light via reflection, a solid light guide with tapered sidewalls that guides light via total internal reflection and/or reflection, a hollow light guide with tapered sidewalls that guides light via reflection, a solid/hollow CPC followed by a hollow/solid light guide with straight sidewalls, a tapered solid/hollow light guide followed by a hollow/solid light guide with straight sidewalls, or a combination of such elements.

The heat sink can be a combination of a plurality of elements of various shapes. For example, the heat sink may have the function of supporting the light guide 420, 520, 620, 720, 1412 and 1512 and other elements such as the lens 411.

FIGS. 7-10 show perspective and cross-sectional views of collimating plates 150, 160, 170 and 180, which can be used with any of the illumination assemblies 500, 600, 700, 800, 900, 1000, 1100, and 1200 and illumination systems 1500, 1600, 1700, 1800, 1900, 2000 and 2100 of this disclosure. For example, each collimating plate 418, 518, 818, 918, 1415 and 1715 of FIGS. 2-6 can be selected from collimating plates 150, 160, 170 and 180 of FIGS. 7-10.

Figure 7A:
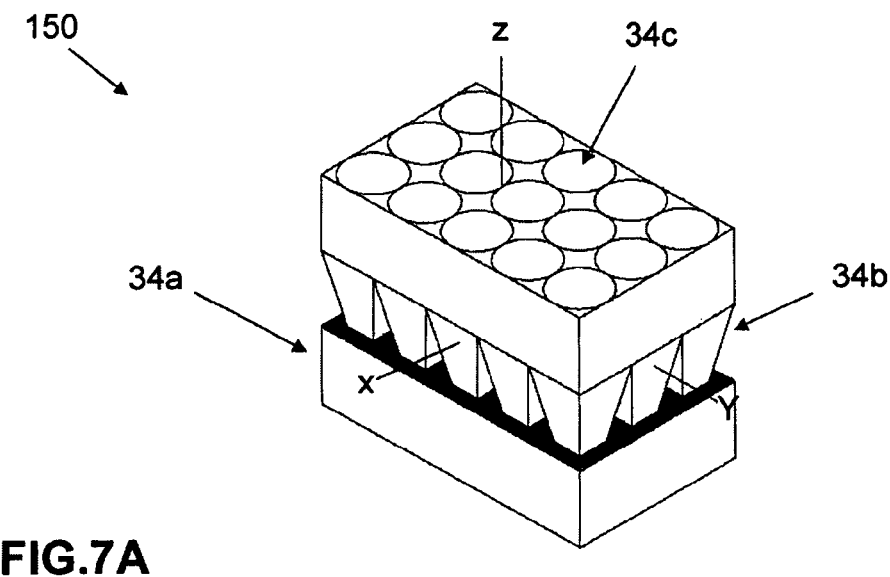
FIG. 7A is a detailed perspective view of a first collimating plate comprising micro-aperture, micro-guide and micro-lens arrays.
Figure 7B:
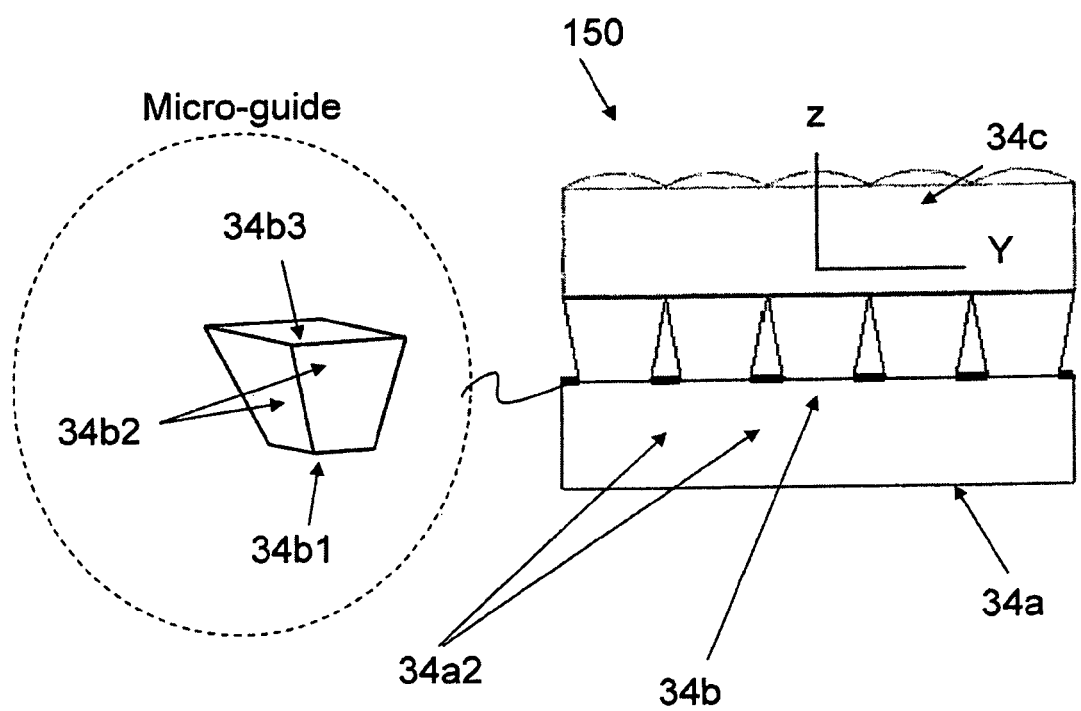
FIG. 7B is a cross-sectional view of the collimating plate of FIG. 7A.

FIG. 7A is a detailed perspective view of a collimating plate 150. Collimating plate 150 includes an aperture plate 34a, micro-guide array 34b and a micro-lens array 34c. Each micro-lens corresponds to a micro-guide and a micro-aperture. As shown in FIG. 7D, the aperture array 34a includes a plate made of a transmissive material 34a1 that is highly transmissive at the desired wavelength. The top surface of the plate has a patterned, highly reflective coating 34a2 applied thereto.

Figure 7C:
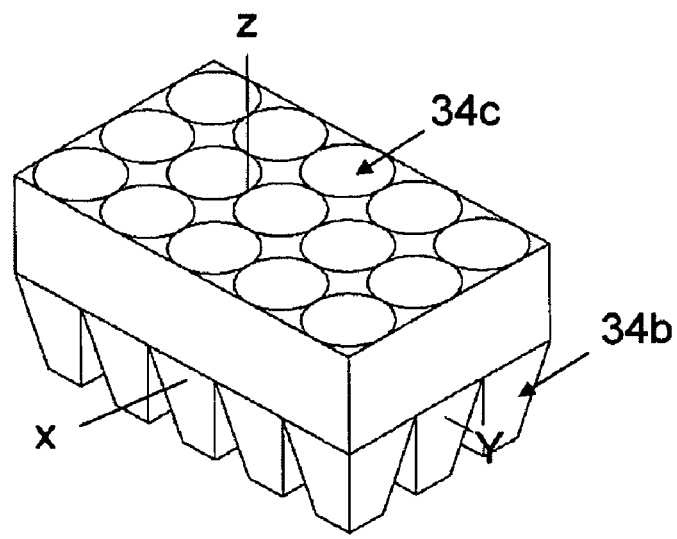
FIG. 7C is a perspective view of the micro-guide and micro-lens arrays of the collimating plate of FIG. 7A.
Figure 7D:
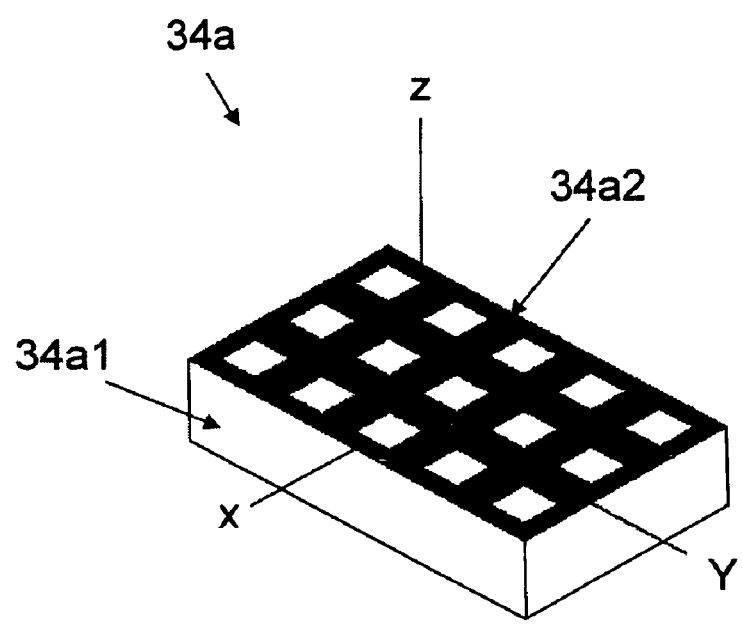
FIG. 7D is a perspective view of the micro-aperture array of the collimating plate of FIG. 7A.

A perspective view of the micro-guide 34b and micro-lens 34c arrays is shown in FIG. 7C. Both arrays 34b and 34c are made on a single glass plate. A cross-sectional view of the aperture 34a, micro-guide 34b and micro-lens 34c arrays is shown in FIG. 7B. In applications were maintaining the polarization state of the light is important, sidewalls of the micro-guides within the micro-guide array 34b can be oriented so that the polarization state of the light entering and exiting the micro-guide array 34b is maintained.

Design parameters of each micro-element (e.g., micro-guide, micro-lens or micro-tunnel) within an array 34a, 34b and 34c include shapes and sizes of entrance and exit apertures, depth, sidewall shapes and taper, and orientation. Micro-elements within an array 34a, 34b and 34c can have uniform, non-uniform, random or non-random distributions and can range in number from one micro-element to millions, with each micro-element capable of being distinct in its design parameters. The size of the entrance/exit aperture of each micro-element is preferably $\geq 5\mu m$, in applications using visible light in order to avoid light diffraction phenomenon. However, it is possible to design micro-elements with sizes of entrance/exit aperture being $<5\mu m$. In such applications, the design should account for the diffraction phenomenon and behavior of light at such scales to provide homogeneous light distributions in terms of intensity, viewing angle and color over a certain area. Such micro-elements can be arranged as a one-dimensional array, two-dimensional array, circular array and can be aligned or oriented individually. In addition, the collimating plate 150 can have a smaller size than the exit face of the guide 420, 520, 620, 720 and 1412 and its shape can be rectangular, square, circular or any other arbitrary shape.

The operation of the collimating plate 150 is described as follows. Part of the light impinging on the collimating plate 150 enters through the openings of the aperture array 34a and the remainder is reflected back by the highly reflective coating 34a2. Light received by the micro-guide array 34b experiences total internal reflection within the micro-guides and becomes highly collimated as it exits array 34b. This collimated light exits the micro-lens array 34c via refraction as a more collimated light. In addition to this high level of collimation, collimating plate 150 provides control over the distribution of delivered light in terms of intensity and cone angle at the location of each micro-element.

Figure 8A:
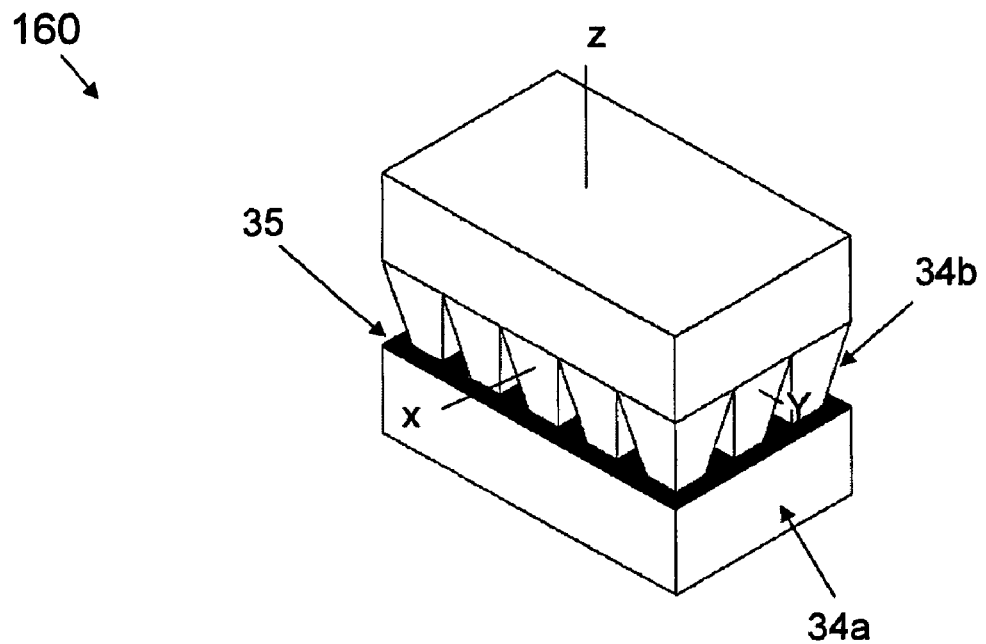
FIG. 8A is a perspective view of a second collimating plate comprising micro-aperture and micro-guide arrays.
Figure 8B:
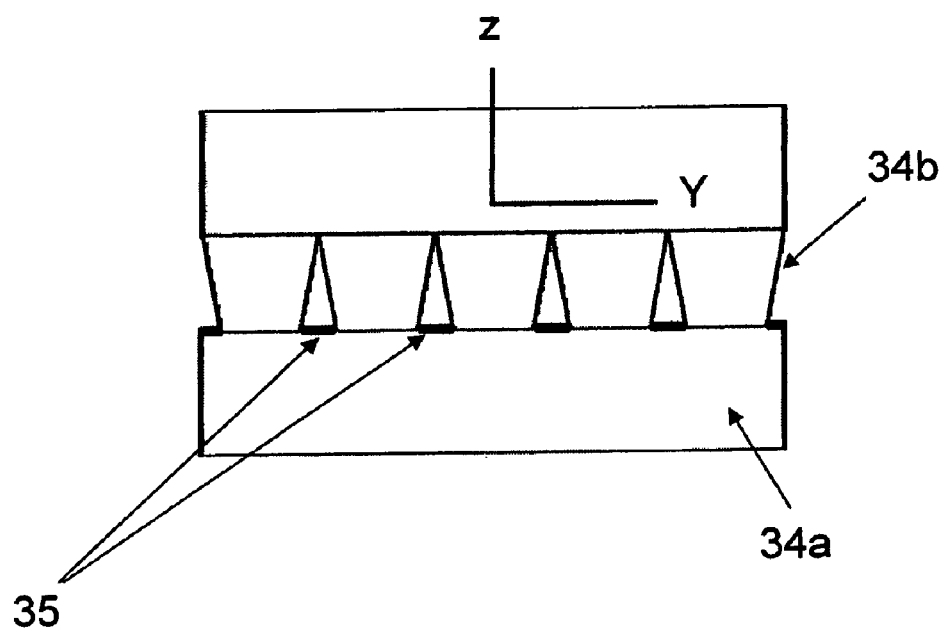
FIG. 8B is a cross-sectional view of the collimating plate of FIG. 8A.
Figure 9A:
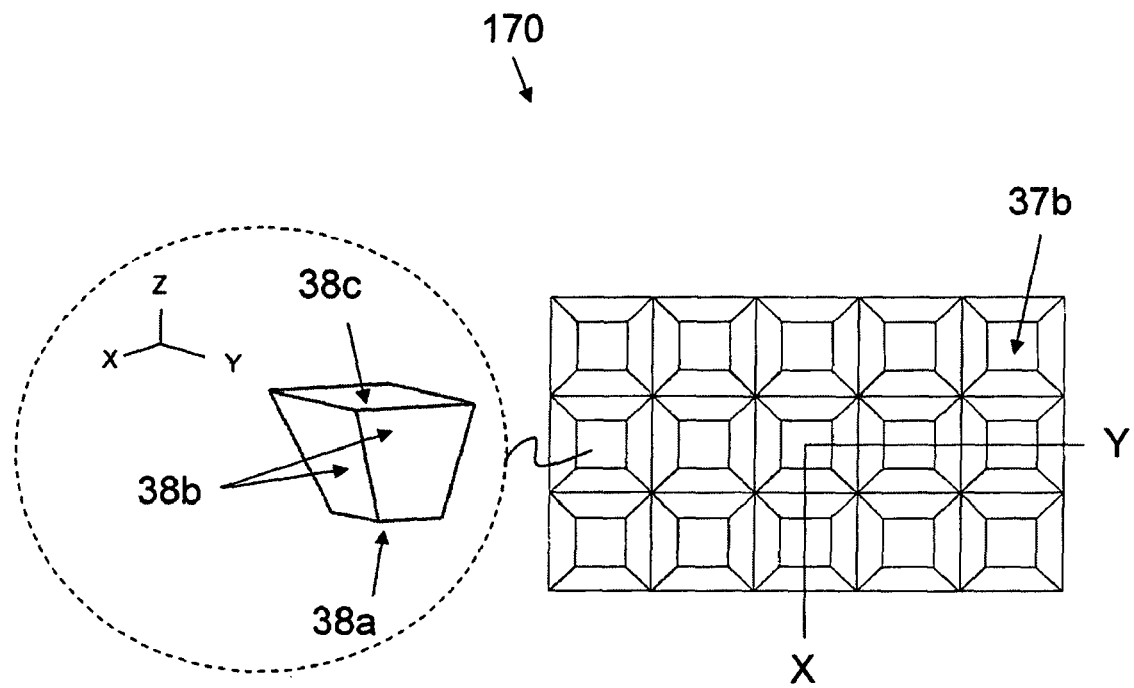
FIG. 9A is a top view of a third collimating plate comprising micro-aperture and micro-tunnel arrays.
Figure 9B:
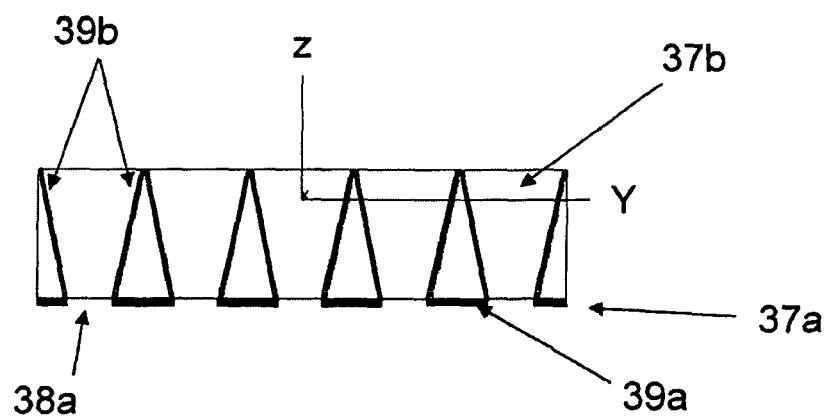
FIG. 9B is a cross-sectional view of the collimating plate of FIG. 9A.

FIGS. 8A-8B show perspective and cross-sectional views of an alternative collimating plate 160 that can be used with any of the illumination assemblies 500, 600, 700, 800, 900, 1000, 1100, and 1200 and illumination systems 1500, 1600, 1700, 1800, 1900, 2000 and 2100 of this disclosure. The collimating plate includes a micro-guide array 34b and an aperture array 34a with a reflective coating on their edges FIGS. 9A-9B show top and cross-sectional views of another alternative collimating plate 170 that can be used with any of the illumination assemblies 500, 600, 700, 800, 900, 1000, 1100, and 1200 and illumination systems 1500, 1600, 1700, 1800, 1900, 2000 and 2100 of this disclosure. The collimating plate 170 includes a hollow micro-tunnel array 37b and an aperture array 37a. The internal sidewalls 38b (exploded view of FIG. 9A) of each micro-tunnel are coated with a highly reflective coating 39b (FIG. 9B). Part of the light impinging on collimating plate 170 enters the hollow micro-tunnel array 37b and gets collimated via reflection. The remainder of this light gets reflected back by the highly reflective coating 39a of aperture array 37a. The advantages of collimating plate 170 are compactness and high transmission efficiency of light without the need for antireflective (AR) coatings at the entrance 38a and exit 38c apertures of its micro-tunnels.

Figure 10A:
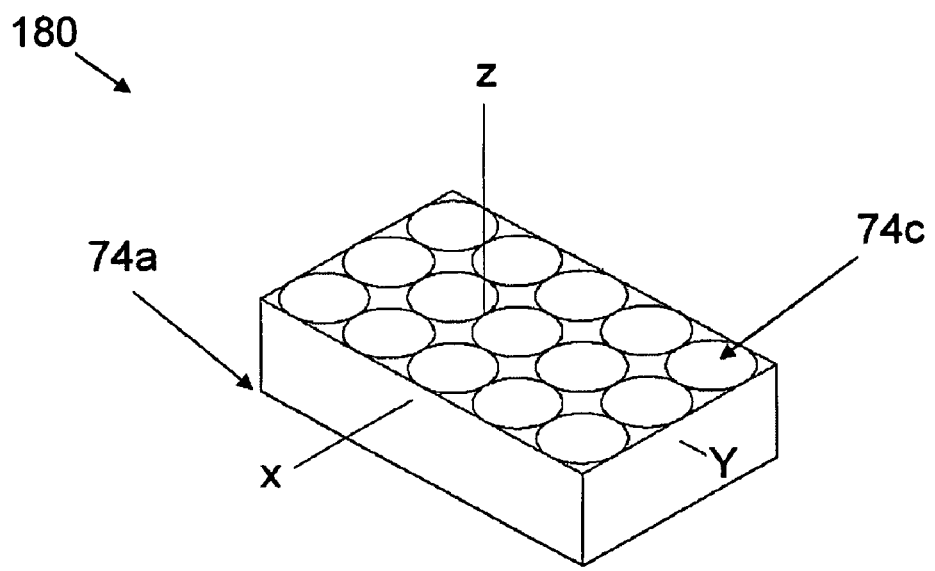
FIG. 10A is a perspective view of a fourth collimating plate comprising micro-aperture and micro-lens arrays.
Figure 10B:
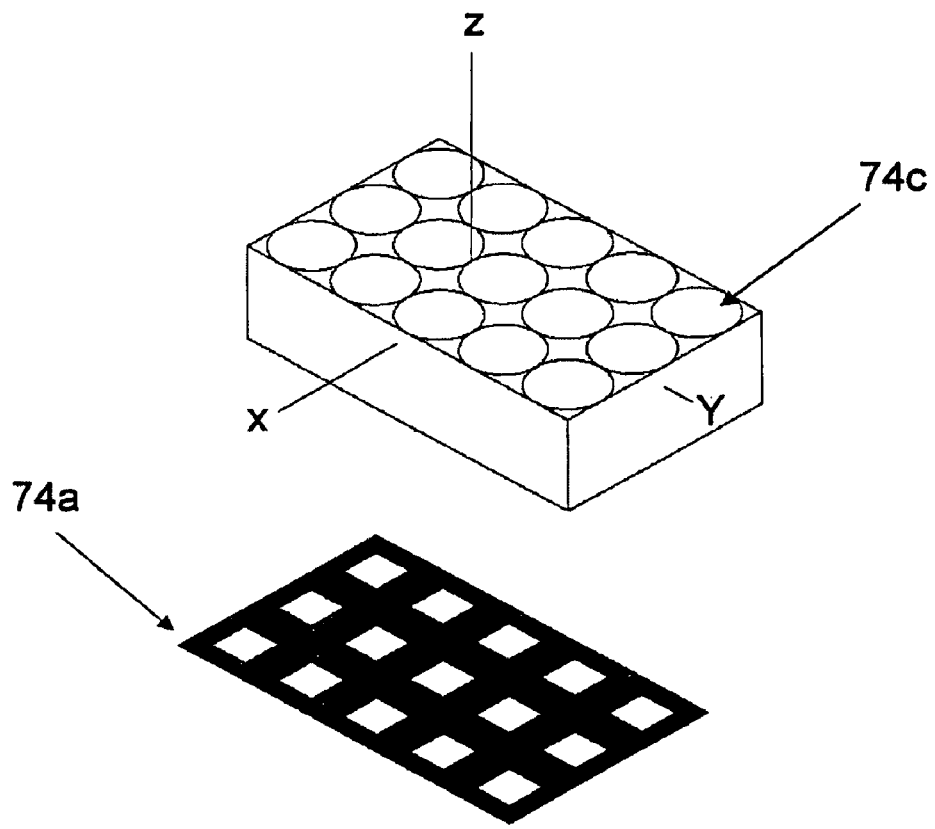
FIG. 10B is an exploded view of the collimating plate of FIG. 10A.
Figure 10C:
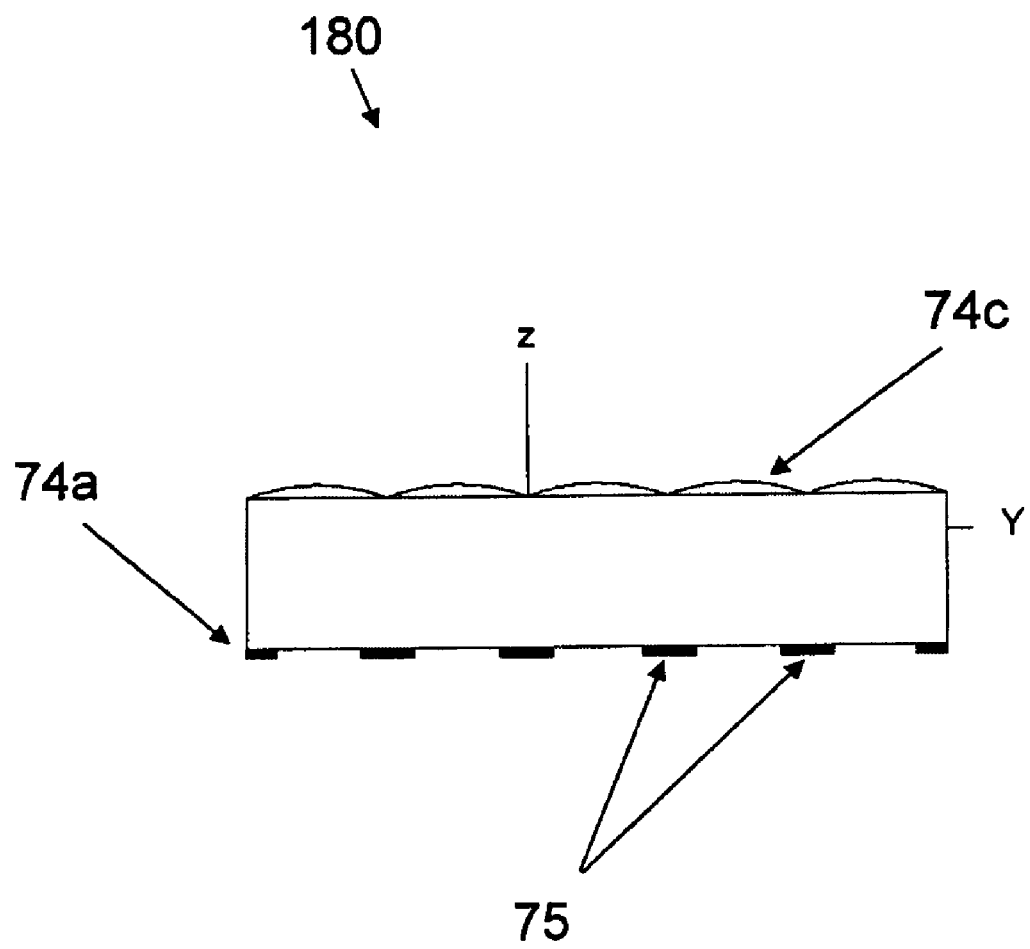
FIG. 10C is a cross-sectional view of the collimating plate of FIG. 10A.

FIGS. 10A-10C show perspective (integrated and exploded) and cross-sectional views of another alternative construction of a collimating plate 180 that can be used with any of the illumination assemblies 500, 600, 700, 800, 900, 1000, 1100, and 1200 and illumination systems 1500, 1600, 1700, 1800, 1900, 2000 and 2100 of this disclosure. The collimating plate 180 includes an aperture array 74a and an optional micro-lens array 74c made on a single plate. In collimating plate 180, the micro-lens array 74c performs the collimation function of delivered radiation via refraction. The aperture array 74a can be deposited directly on the exit face of a solid light guide 420, 520, 620, 720, 1412 and 1512.

Additional details of the construction, manufacture and operation of collimating plates, such as example collimating plates 150, 160, 170 and 180, are given in U.S. Pat. Nos. 7,306,344; 7,318,644; and 7,400,805, which are all incorporated herein by reference.

Figure 11A:
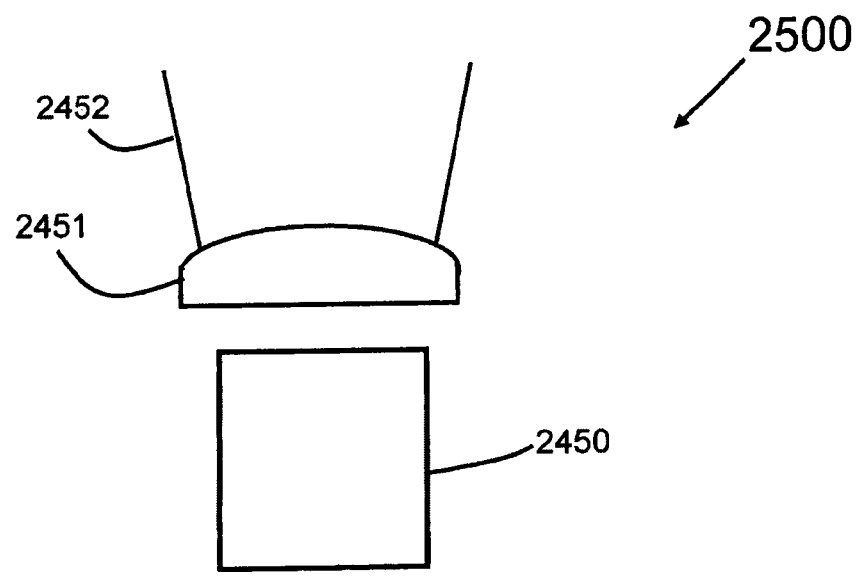
FIG. 11A is a cross-sectional view of an illumination system utilizing an illumination assembly and a projection lens.

FIG. 11A shows a cross-sectional view of an illumination system 2500 that utilizes a projection lens 2451 and an illumination assembly or system 2450 to deliver a light beam 2452. Illumination assembly or system 2450 can be selected from any of the illumination assemblies and systems of this disclosure including illumination assemblies 500, 600, 700, 800, 900, 1000, 1100, and 1200 and illumination systems 1500, 1600, 1700, 1800, 1900, 2000, and 2100. For example, illumination system 2500 can be used as an automobile headlight or as a spot light.

Figure 11B:
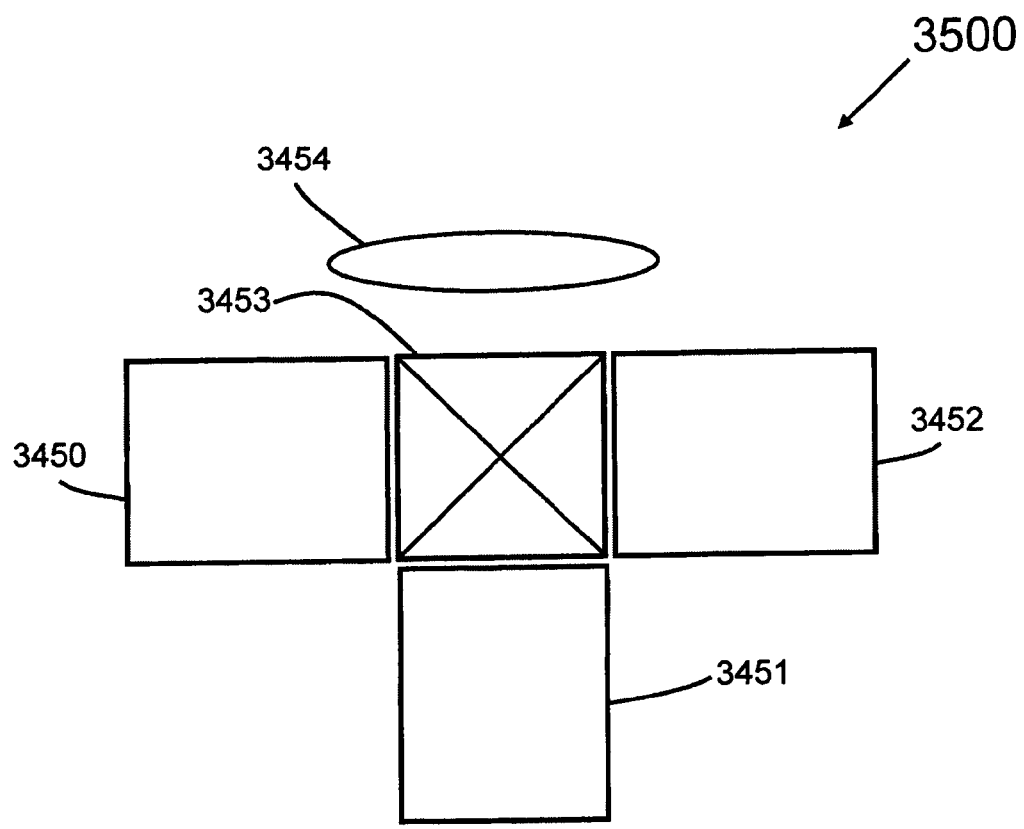
FIG. 11B is a cross-sectional view of an illumination system utilizing multiple illumination assemblies and a lens.

FIG. 11B shows a cross-sectional view of an illumination system 3500 that includes a plurality of illumination assemblies 3450, 3451 and 3452, an X-plate 3453, an optional relay lens 3454, a micro-display (not shown), a projection lens (not shown), and an optional screen (not shown). Illumination assemblies 3450, 3451 and 3452 are selected from illumination assemblies 500, 600, 700, 800, 900, 1000, 1100 and 1200 of this disclosure and may include a collimation element in their architecture to deliver collimated light (e.g. red, green and blue) to the X-plate. The X-plate 3453 and relay lens 3454 are utilized to combine the output light beams from illumination assemblies 3450, 3451 and 3452 and deliver the combined beams to a micro-display (e.g. transmissive HTPS, Digital Micro-Mirror (DMD) and Liquid Crystal on Silicon (LCOS) micro-displays), which in turn delivers the beams to a projection lens to project an image onto a screen. The transmissive HTPS micro-display can have a micro-lens array (MLA) in its structure to enhance its optical efficiency or may have a reflective layer replacing (or added to) the black matrix layer to reflect light that impinges on areas outside the pixel aperture back to the illumination assembly for recycling. The transmissive HTPS micro-display can be attached directly to (or placed in close proximity to) the X-plate 3453 without using relay lens 3454.

Figure 11C:
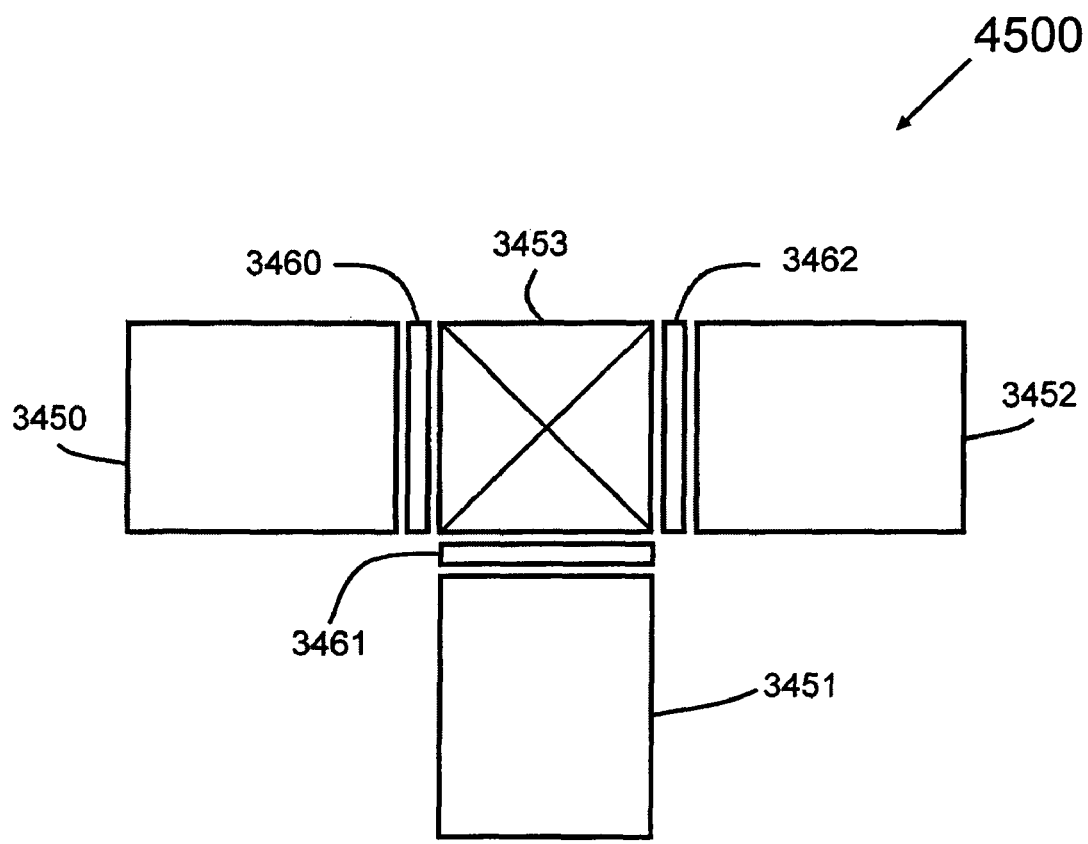
FIG. 11C is a cross-sectional view of an illumination system utilizing multiple illumination assemblies and multiple transmissive micro-displays.

FIG. 11C shows a cross-sectional view of an illumination system 4500 that includes a plurality of illumination assemblies 3450, 3451 and 3452, an X-plate 3453, a plurality of micro-displays 3460, 3461 and 3462, an optional relay lens, a projection lens (not shown), and an optional screen (not shown). Micro-displays 3460, 3461 and 3462 are of the transmissive type (e.g. High Temperature Poly Silicon (HTPS) micro-displays). The X-plate 3453 combines a plurality of light beams received from a plurality of micro-displays 3460, 3461 and 3462 and delivers the combined beams to a projection lens, which in turn projects an image onto a screen.

Figure 11D:
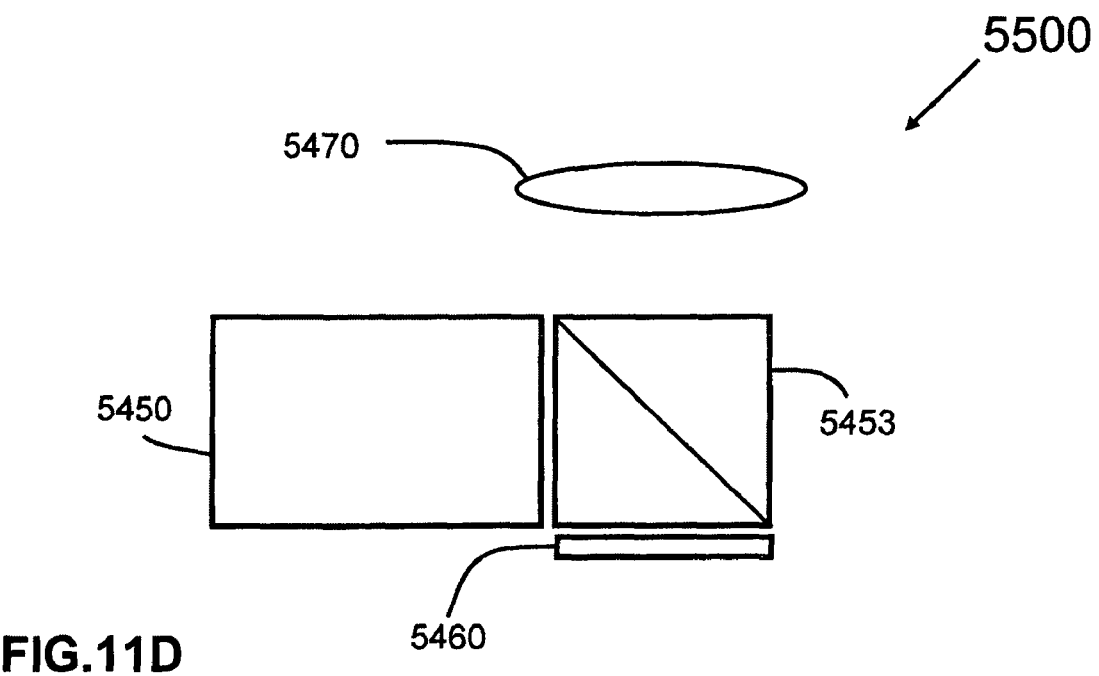
FIG. 11D is a cross-sectional view of an illumination system utilizing an illumination assembly, relay optics, a lens and a reflective micro-display.

FIG. 11D shows a cross-sectional view of a compact illumination system 5500 that includes an illumination assembly 5450, relay optics 5453, a micro-display 5460, an optional relay lens 5470, a projection lens (not shown) and an optional screen (not shown). Illumination assembly 5450 utilizes one assembly (rather than a plurality of assemblies) to provide light with combined colors to a color-sequentially operated micro-display (e.g. Digital Micro-Mirror (DMD) or Liquid Crystal on Silicon (LCOS) micro-display) through relay optics 5453. Relay optics can be a group of total internal reflection (TIR) prisms, a polarizing beamsplitter (PBS), a lens or group of lenses.

Figure 11E:
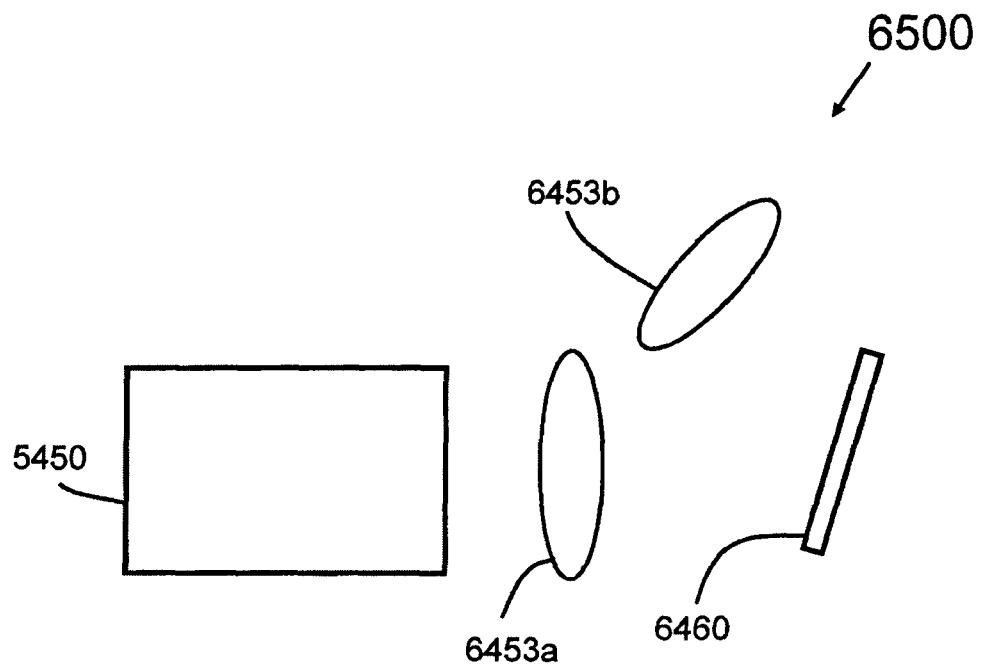
FIG. 11E is a cross-sectional view of an illumination system utilizing an illumination assembly, relay lenses and a reflective micro-display.

FIG. 11E shows a cross-sectional view of an illumination system 6500 that includes an illumination assembly 5450, relay lenses 6453*a* and 6453*b*, a reflective micro-display (e.g. DMD type) 5460, a projection lens (not shown) and an optional screen (not shown). This illumination system 6500 is a special case of illumination system 5500 of FIG. 11D.

Figure 11F:
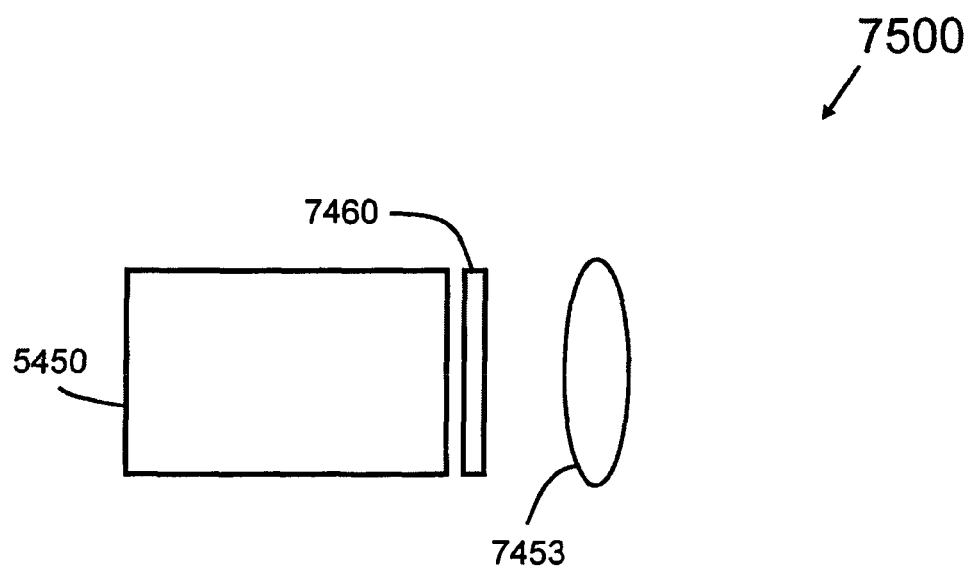
FIG. 11F is a cross-sectional view of an illumination system utilizing an illumination assembly, a transmissive micro-display and a projection lens.

FIG. 11F shows a cross-sectional view of an illumination system 7500 that includes an illumination assembly 5450, a transmissive micro-display (e.g. HTPS type) 7460, an optional relay lens 7453, a projection lens (not shown) and an optional screen (not shown). The transmissive micro-display 7460 can have a micro-lens array (MLA) in its structure to enhance the optical efficiency or may have a reflective layer replacing (or added to) the black matrix layer to reflect light that impinges on areas outside the pixel aperture back to the illumination assembly 5450 for recycling. The transmissive micro-display 7460 can be in close proximity or directly attached to illumination assembly 5450. This kind of architecture is discussed in U.S. Pat. No. 7,379,651 to N. Abu-Ageel, titled "Method and Apparatus for Reducing Laser Speckle", which is incorporated herein by reference.

Further discussion of illumination (or projection system) architectures is included in U.S. patent application Ser. No. 11/833,222 to N. Abu-Ageel, titled "LED Based Illumination and Projection Systems", filed on Aug. 2, 2007, which is incorporated herein by reference.

Figure 12A:
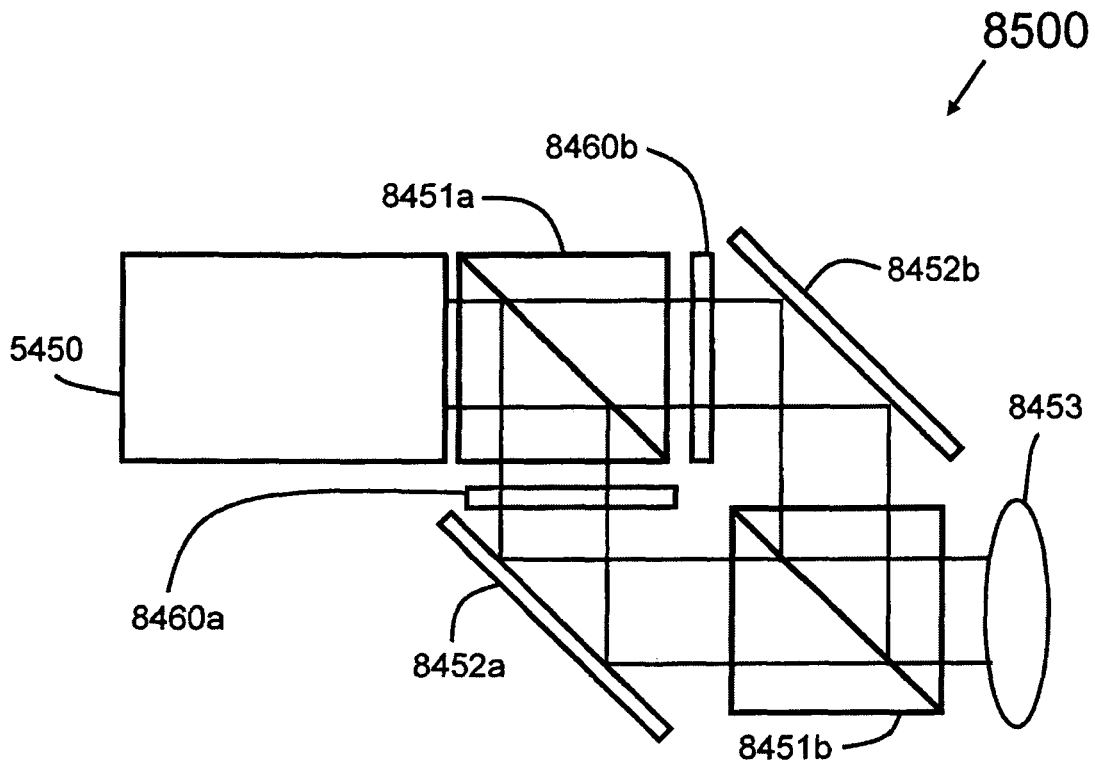
FIG. 12A is a cross-sectional view of a 2D/3D illumination system utilizing an illumination assembly and two transmissive micro-displays.

FIG. 12A shows a cross-sectional view of a 2D/3D illumination system 8500 that includes an illumination assembly 5450, polarizing beamsplitters (PBSs) 8451*a* and 8451*b*, transmissive micro-displays (e.g. HTPS type) 8460*a* and 8460*b*, mirrors 8452*a* and 8452*b*, an optional relay lens 8453, a projection lens (not shown) and an optional screen (not shown).

Figure 12B:
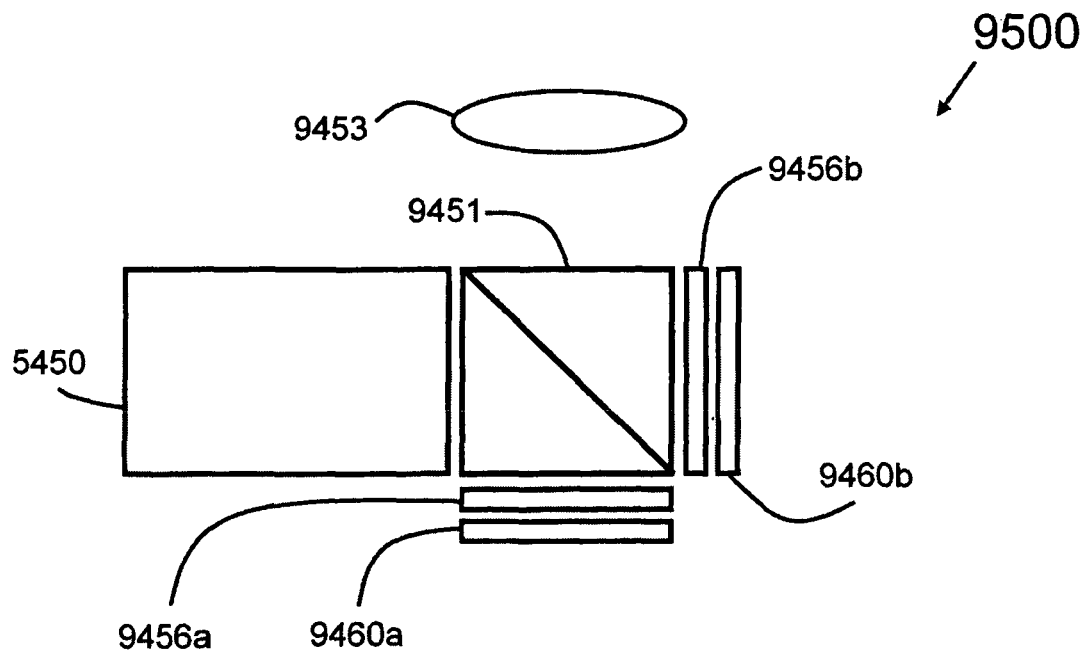
FIG. 12B is a cross-sectional view of a 2D/3D illumination system utilizing an illumination assembly and two reflective micro-displays.

FIG. 12B shows a cross-sectional view of a 2D/3D illumination system 9500 that includes an illumination assembly 5450, a polarizing beamsplitter (PBS) 9451, reflective micro-displays (e.g. LCOS type) 9460*a* and 9460*b*, optional quarter wave plates 9456*a* and 9456*b*, an optional relay lens 9453, a projection lens (not shown) and an optional screen (not shown). Other architectures of 1D/2D/3D illumination systems (or projection systems) can utilize illumination assemblies and systems of this disclosure including the ones discussed in U.S. patent application Ser. No. 7,270,428 to Alasaarela et al., titled "2D/3D Data Projector", which is incorporated herein by reference.

Illumination assembly 5450 of FIGS. 11D-11F and FIGS. 12A-12B can be selected from illumination assemblies 500, 600, 700, 800, 900, 1000, 1100 and 1200 (e.g. utilizing red, green and blue phosphors to provide a combined red, green and blue colors) of this disclosure and may include a collimation element in their architecture to deliver collimated light (e.g. white light consisting of red, green and blue colors) to the micro-display. Furthermore, illumination assembly 5450 can be selected from illumination systems 1500, 1600, 1700, 1800, 1900, 2000 and 2100.

Other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined with reference to the appended claims along with their full scope of equivalents.

What is claimed is:

1. An illumination system, comprising:
 a tapered hollow light guide having an interior cavity, a light entrance aperture and a light exit aperture, the light entrance aperture having less area that the light exit aperture;
 wavelength conversion material located within the interior cavity of the hollow light guide; and
 a reflective layer formed along the walls of the interior cavity.

2. The illumination system of claim 1, wherein the wavelength conversion material converts absorbed light into output light having a higher wavelength range than the absorbed light.

3. The illumination system of claim 1, further comprising a low-refractive index layer between the wavelength conversion material and the reflective layer.

4. The illumination system of claim 3, wherein the low-refractive index layer has a refractive index that is lower than the refractive index of the wavelength conversion material.

5. The illumination system of claim 3, wherein the low-refractive index layer is air or nano-porous $SiO_2$.

6. The illumination system of claim 1, further comprising a collimating plate.

7. The illumination system of claim 1, further comprising a partially reflective optical element covering the exit aperture of the hollow light guide.

8. A system, comprising:
 a tapered hollow light guide having an interior cavity, a light entrance aperture and a light exit aperture, the light entrance aperture having less area that the light exit aperture;
 wavelength conversion material located within the interior cavity of the hollow light guide;
 a reflective layer formed along the walls of the interior cavity; and
 a low-refractive index layer between the wavelength conversion material and the reflective layer.

9. The system of claim 8, wherein the reflective layer is formed on the interior walls of the cavity.

10. The system of claim 8, wherein the reflective layer is formed on the exterior of the cavity.

11. The system of claim 8, further comprising a partially reflective optical element covering the exit aperture of the hollow light guide.

12. The system of claim 8, further comprising a collimating plate at the exit aperture of the hollow light guide.

13. The system of claim 8, further comprising:
 a light source; and
 a clear hole formed in the entrance aperture for admitting light from the light source.

14. The system of claim 13, wherein the wavelength conversion material is a layer having a hole formed therein aligned with the clear hole formed in the entrance aperture.

15. The system of claim 13, further comprising:
a lens located between the light source and the clear hole, for focusing light from the source into the clear hole.

16. The system of claim 8, wherein the light guide has transparent walls.

17. The illumination system of claim 1, further comprising:
a solid light guide receiving light from the light exit aperture of the hollow light guide.

18. The illumination system of claim 1, further comprising:
a light source configured to emit light into the entrance aperture.

19. The illumination system of claim 1, further comprising:
a partially reflective optical element covering the exit aperture of the hollow light guide.

20. The illumination system of claim 1, further comprising:
an optical element covering the exit aperture of the hollow light guide, the optical element selected from the group consisting of a reflective polarizer, a dichroic mirror, a dichroic cube, a diffractive optical element, a micro-refractive element, a brightness enhancement film, a hologram, a filter that blocks UV or near UV light, a photonic crystal, and any suitable combination of the foregoing.

* * * * *